United States Patent [19]
Renfrew et al.

[11] Patent Number: 5,171,852
[45] Date of Patent: Dec. 15, 1992

[54] TRIPHENODIOXAZINE REACTIVE DYES HAVING SULPHONATE ESTER GROUPS

[75] Inventors: Andrew H. M. Renfrew, Bury; Denis R. A. Ridyard, Stockport; Brian Lamble, Oldham, all of United Kingdom

[73] Assignee: Imperial Chemical Industries PLC, London, England

[21] Appl. No.: 517,442

[22] Filed: Apr. 25, 1990

Related U.S. Application Data

[63] Continuation of Ser. No. 373,047, Jun. 29, 1989, abandoned, which is a continuation of Ser. No. 134,746, Dec. 18, 1987, abandoned.

[30] Foreign Application Priority Data

Jan. 20, 1987 [GB] United Kingdom ............... 8701145
Feb. 13, 1987 [GB] United Kingdom ............... 8703307

[51] Int. Cl.$^5$ .................. C09B 62/002; C09B 62/04; C09B 62/503; D06P 1/38
[52] U.S. Cl. ........................... 544/76; 544/77
[58] Field of Search ................. 544/76, 77

[56] References Cited

U.S. PATENT DOCUMENTS

| | | | |
|---|---|---|---|
| 2,763,641 | 9/1956 | Seitz et al. | 544/76 X |
| 3,117,957 | 1/1964 | Boyd et al. | 544/76 X |
| 3,316,239 | 4/1967 | Riat et al. | 544/76 X |
| 4,092,478 | 5/1978 | Plant et al. | |
| 4,213,899 | 7/1980 | Phillips et al. | 544/76 X |
| 4,263,206 | 4/1981 | Anderson | 544/76 X |
| 4,400,504 | 8/1983 | Harms et al. | 544/76 |
| 4,622,396 | 11/1986 | Harms et al. | 544/76 |
| 4,629,788 | 12/1986 | Jager | 544/76 |
| 4,665,179 | 5/1987 | Wunderlich et al. | 544/76 |
| 4,780,107 | 10/1988 | Sawamoto et al. | 544/76 X |

FOREIGN PATENT DOCUMENTS

| | | | |
|---|---|---|---|
| 50-14654 | 10/1982 | Japan | 544/76 |
| 1368158 | 12/1972 | United Kingdom | 544/76 |
| 2014872 | 11/1979 | United Kingdom | 544/76 |
| 2059985 | 4/1981 | United Kingdom | 544/76 |

Primary Examiner—Mary C. Lee
Assistant Examiner—Fiona T. Powers
Attorney, Agent, or Firm—Cushman, Darby & Cushman

[57] ABSTRACT

Triphenodioxazine reactive dyes, useful for dyeing cellulosic fibers, of the formula:

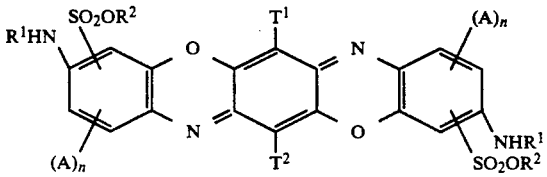

wherein
each of $T^1$ and $T^2$, independently, represents H, Cl, Br, F, $SO_3H$ or an optionally substituted alkyl or aryl radical;
$R^1$ represents H or an optionally substituted hydrocarbon or heterocyclic radical;
$R^2$ represents an optionally substituted hydrocarbon radical;
A represents $C_{1-4}$-alkyl, $C_{1-4}$-alkoxy, Cl, COOH or $SO_3H$, and
n has a value of 0 or 1, the nature of the substituents being such that the dyes contain at least two $SO_3H$ groups and at least two fibre-reactive groups.

16 Claims, No Drawings

TRIPHENODIOXAZINE REACTIVE DYES HAVING SULPHONATE ESTER GROUPS

This is a continuation of application Ser. No. 07/373,047, filed on Jun. 29, 1989, which was abandoned upon the filing hereof, which in turn is a continuation of application Ser. No. 07/134,746, filed Dec. 18, 1987, now abandoned.

This invention relates to reactive dyes and more particularly to reactive dyes of the triphenodioxazine series and their application to textile materials.

Reactive dyes of the triphenodioxazine series are known and have been described in, for example, United Kingdom Patent Specifications 1349513, 1368158, 1450746, 1477071, 1559752 and 2059985. These specifications provide relatively broad definitions of sulphonated triphenodioxazine dyes having fibre-reactive groups but the dyes specifically described in detail are generally of the structure:

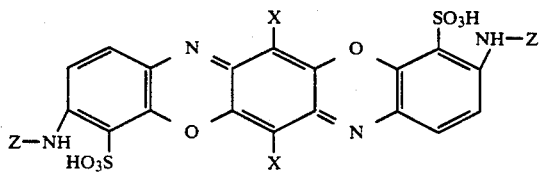

wherein X represents a chlorine or bromine atom and Z represents a residue which includes a fibre-reactive group.

It has now been found that triphenodioxazine reactive dyes carrying sulphonate ester substituents exhibit a range of useful properties when applied to cellulosic textiles.

Accordingly, the invention provides triphenodioxazine reactive dyes which, in the free acid form, have the formula:

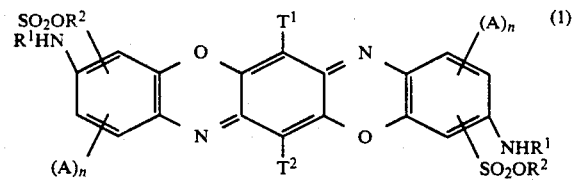

wherein
  each of $T^1$ and $T^2$, independently, represents H, Cl, Br, F, $SO_3H$ or an optionally substituted alkyl or aryl radical;
  $R^1$ represents H or an optionally substituted hydrocarbon or heterocyclic radical;
  $R^2$ represents an optionally substituted hydrocarbon radical;
  A represents $C_{1-4}$-alkyl, $C_{1-4}$-alkoxy, Cl, COOH or $SO_3H$, and
  n has a value of 0 or 1,
the nature of the substituents being such that the dyes contain at least two $SO_3H$ groups and at least two fibre-reactive groups.

The fibre-reactive groups present in the dyes of Formula (1) are groups capable, under suitable conditions, of reacting with the hydroxyl groups present in cellulosic fibres or with the amino groups present in natural and synthetic fibres to form a covalent linkage between the dye and the fibre. Such groups have been fully described in the prior art, for example in our GB 2063284A. The location of the fibre-reactive group is preferably such that at least one of $R^1$ and $R^2$ is or includes a fibre-reactive group.

The optionally substituted hydrocarbon radicals represented by $R^1$ and $R^2$ are typically optionally substituted alkyl, cycloalkyl, aralkyl and aryl radicals. In the case of $R^1$, the preferred hydrocarbon radicals are optionally substituted alkyl radicals; $R^2$ is preferably an optionally substituted aryl radical.

Optionally substituted heterocyclic radicals which may be represented by $R^1$ include fibre-reactive heterocyclic radicals, for example appropriately substituted triazinyl and pyrimidinyl radicals such as monochlorotriazinyl, sulphotriazinyl, dichloropyrimidinyl and trichloropyrimidinyl radical.

Examples of optionally substituted alkyl radicals which may be represented by $T^1$, $T^2$, $R^1$ and $R^2$ particularly include $C_{1-4}$-alkyl groups. Examples of optionally substituted aryl radicals which may be represented by $T^1$, $T^2$, $R^1$ and $R^2$ particularly include optionally substituted phenyl radicals, for example phenyl, sulphophenyl, methylphenyl, disulphophenyl, dimethylphenyl, methoxyphenyl, dimethoxyphenyl, chlorophenyl, dichlorophenyl, methylchlorophenyl, methoxymethylphenyl, methoxychlorophenyl, aminophenyl and acetylaminophenyl. Examples of optionally substituted aralkyl radicals which may be represented by $R^1$ and $R^2$ include benzyl and mono- and di-sulphobenzyl.

Optionally substituted hydrocarbon radicals which may be represented by $R^1$ particularly include radicals of the formula:

$$-X-NR^3-Z \qquad (2)$$

wherein X represents an optionally substituted alkylene, aralkylene or arylene radical, $R^3$ represents hydrogen or an optionally substituted hydrocarbon radical and Z represents a fibre-reactive group.

Optionally substituted hydrocarbon radicals which may be represented by $R^3$ particularly include optionally substituted alkyl (especially $C_{1-4}$alkyl) and optionally substituted aryl (especially phenyl) radicals.

The residues represented by X in Formula (2) are preferably alkylene or aralkylene residues and as examples of such groups there may be mentioned:
ethylene
1,2- and 1,3-propylene
2-hydroxy-1,3-propylene
1- and 2-phenyl-1,3-propylene
2-(4'-sulphophenyl)-1,3-propylene
1,4-, 2,3- and 2,4-butylene
2-methyl-1,3-propylene
2-methyl-2,4-pentylene
2.2-dimethyl-1,3-propylene
1-phenylethylene
1-chloro-2,3-propylene
1,6- and 2,5-hexylene
2,3-diphenyl-1,4-butylene
1-(methoxycarbonyl)-1,5-pentylene
1-carboxy-1,5-pentylene
2,7-heptylene
3-methyl-1,6-hexylene

—CH$_2$CH$_2$OCH$_2$CH$_2$—

—CH$_2$CH$_2$SCH$_2$CH$_2$—

-continued

—CH$_2$CH$_2$SSCH$_2$CH$_2$—

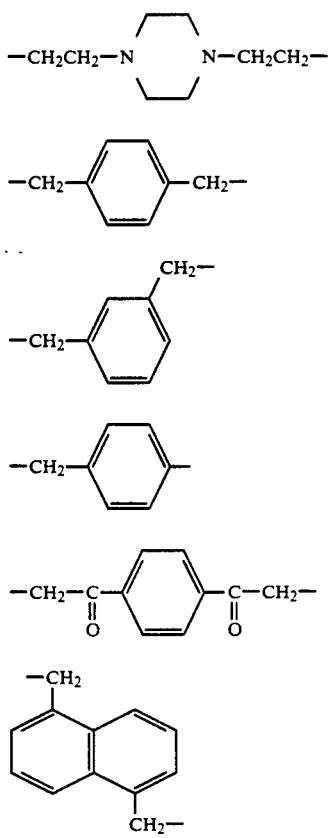

The fibre-reactive groups represented by Z may be any of the fibre-reactive groups described in the prior art. They may be any conventional cellulose reactive group such as those disclosed in patent specifications and other literature on reactive dyes, e.g. UK Patent Specification No. 1440948.

As examples of cellulose reactive groups there may be mentioned aliphatic sulphonyl groups which contain a sulphate ester group in beta-position to the sulphur atom, e.g. beta-sulphatoethylsulphonyl groups, alpha,-beta-unsaturated acyl radicals of aliphatic carboxylic acids, for example acrylic acid, alpha-chloroacrylic acid, alpha-bromoacrylic acid, propiolic acid, maleic acid and mono- and dichloro maleic acids; also the acyl radicals of acids which contain a substituent which reacts with cellulose in the presence of an alkali, e.g. the radical of a halogenated aliphatic acid such as chloroacetic acid, beta-chloro and beta-bromopropionic acids and alpha,beta-dichloro- and dibromopropionic acids or radicals of vinylsulphonyl- or beta-chloroethylsulphonyl- or beta-sulphatoethyl-sulphonyl-endo-methylene cyclohexane carboxylic acids. Other examples of cellulose reactive groups are tetrafluorocyclobutyl carbonyl, trifluorocyclobutenyl carbonyl, tetrafluorocyclobutylethenyl carbonyl, trifluorocyclobutenylethenyl carbonyl; activated halogenated 1,3-dicyanobenzene radicals such as
2,4-dicyano-3,5-difluoro-6-chlorophenyl,
2,4-dicyano-3,5-difluoro-6-nitrophenyl,
2,4-dicyano-3,5,6-trifluorophenyl,
2,4-dicyano-3,5,6-trichlorophenyl,
2,4,6-tricyano-3,5-difluorophenyl,
2,4,6-tricyano-3,5-dichlorophenyl and heterocyclic radicals which contain 1, 2 or 3 nitrogen atoms in the heterocyclic ring and at least one cellulose reactive substituent on a carbon atom of the ring.

It may be noted that many reactive groups may be defined as both heterocyclic or acyl groups since they consist of an acyl group carrying a heterocyclic substituent. For convenience in such cases where the heterocyclic ring carries the cellulose reactive substituent these are usually referred to as heterocyclic reactive groups in this specification.

As examples of such heterocyclic radicals there may be mentioned for example:
2:3-dichloroquinoxaline-5- or -6-sulphonyl,
2:3-dichloroquinoxaline-5- or -6-carbonyl,
2:4-dichloroquinazolin-6- or -7-sulphonyl,
2:4:6-trichloroquinazolin-7- or -8-sulphonyl,
2:4:7- or 2:4:8-trichloroquinazolin-6-sulphonyl,
2:4-dichloroquinazolin-6-carbonyl,
1:4-dichlorophthalazine-6-carbonyl,
4:5-dichloropyridazon-1-yl-ethylcarbonyl,
2:4-dichloropyrimidine-5-carbonyl,
4-(4':5'-dichloropyridaz-6'-on-1'-yl)benzoyl,
2-chlorobenzthiazole-6-carbonyl,
3,6-dichloropyrazin-4-carbonyl,
4-(4':5'-dichloropyridaz-6'-on-1'-yl)phenylsulphonyl;
activated 4,6-dihalopyridin-2-yl and 2,6-dihalopyridin-4-yl groups such as:
3,4,5,6-tetrafluoropyridin-2-yl,
2,3,5,6-tetrafluoropyridin-4-yl,
2,4,6-trifluoro-3-cyanopyridin-4-yl,
2,5,6-trichloro-3-cyanopyridin-4-yl,
2,6-difluoro-3-cyano-5-chloropyridin-4-yl,
2,6-difluoro-3,5-dichloropyridin-4-yl and more particularly triazinyl or pyrimidinyl groups.

Examples of particular pyrimidinyl groups are pyrimidin-2-yl or -4-yl groups having a cellulose reactive atom or group especially Cl, Br or F in at least one of the remaining 2-, 4- and 6-positions. The 5-position may carry various substituents such as Cl or CN which are not normally cellulose reactive in themselves but may enhance the reactivity of substituents in other positions of the pyrimidine ring. As specific examples of such pyrimidinyl groups there may be mentioned:
2,6-dichloropyrimidin-4-yl,
4,6-dichloropyrimidin-2-yl,
2,5,6-trichloropyrimidin-4-yl,
4,5,6-trichloropyrimidin-2-yl,
5-chloro-2-methylsulphonyl-6-methylpyrimidin-4-yl,
2,6-dichloro-5-cyanopyrimidin-4-yl,
4,6-dichloro-5-cyanopyrimidin-2-yl,
2,6-difluoro-5-chloropyrimidin-4-yl,
4,6-difluoro-5-chloropyrimidin-2-yl,
2,6-difluoro-5-cyanopyrimidin-4-yl,
4,6-difluoro-5-cyanopyrimidin-2-yl.

Examples of particular triazinyl groups are triazin-2-yl groups having cellulose reactive atoms or groups on one or both of the 4- and 6-positions. In this instance a wide range of cellulose reactive atoms or groups are available such as activated aryloxy or various groups linked through a sulphur atom, e.g. SO$_3$H but the preferred reactive atoms or groups are F, Br or especially Cl; quaternary ammonium groups such as tri-lower alkyl ammonium, e.g. (CH$_3$)$_3$N$^+$— and pyridinium groups especially those derived from pyridine carboxylic acids in particular from nicotinic acid.

The triazinyl groups having only one reactive atom or group on the nucleus in the 4- or 6-position may have a substituent not reactive to cellulose in the remaining 4- or 6-position.

As examples of such non-reactive substituents there may be mentioned alkyl or aryl thio groups, alkoxy or aryloxy groups and optionally substituted amino groups.

Preferred forms of these groups include lower, i.e. $C_{1-4}$-alkoxy, e.g. methoxy, ethoxy, n-propoxy and iso-propoxy, butoxy and lower alkoxy lower alkoxy, e.g. beta-methoxy-ethoxy, beta-ethoxyethoxy, phenoxy and sulphophenoxy; amino; lower alkylamino, e.g. methylamino, ethylamino, butylamino, di(lower alkyl)amino, e.g. dimethylamino, diethylamino, methylethylamino, dibutylamino and groups of the latter two types in which the alkyl groups are substituted, in particular by OH, CN or $SO_3H$, e.g. beta-hydroxyethylamino, di(beta-hydroxyethyl)amino, beta-cyanoethylamino, di(beta-cyanoethyl)amino, beta-sulphoethylamino, beta-hydroxypropylamino, (beta-hydroxybutyl)ethylamino and (beta-hydroxyethyl)methylamino; cycloalkylamino, e.g. cyclohexylamino; cyclic amino, e.g. morpholino or piperazino; naphthylamino substituted by 1,2 or 3 $SO_3H$ groups and optionally substituted phenyl amino groups.

As a particularly preferred form of the optionally substituted phenylamino groups there may be mentioned groups of the formula:

(3)

where G=H, methyl, ethyl, -sulphomethyl, beta-carboxy-, beta-hyroxy- or beta-cyanoethyl and Y and X are each independently selected from H, COOH, $SO_3H$, $CH_3$, $C_2H_5$, $OCH_3$, $OC_2H_5$, Cl, Br, CN, $NO_2$, $NHCOCH_3$ and beta-sulphatoethylsulphonyl.

A particularly important class of dyes within the scope of Formula (1) are the dyes of the formula:

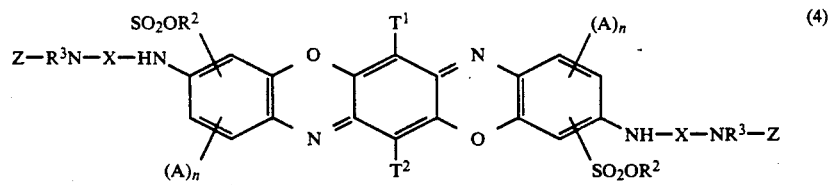
(4)

wherein $T^1$, $T^2$, A, n, $R^2$, X and Z have the meanings given above and $R^3$ is hydrogen or an optionally substituted alkyl or aryl radical, the nature of the substituents being such that the dyes contain at least two $SO_3H$ groups.

Optionally substituted hydrocarbon radicals which may be represented by $R^1$ also include sulphatoethyl groups which are known to be fibre-reactive.

Optionally substituted hydrocarbon radicals which may be represented by $R^2$ particularly include radicals of the formula:

(5)

wherein each of $Q^1$ and $Q^2$ represents hydrogen or a non-fibre-reactive substituent, for example chlorine, bromine, lower alkyl, lower alkoxy, acylamino or sulpho and $Q^3$ represents $Q^1$ or a fibre-reactive substituent, especially halogenotriazinylamino, halogenopyrimidinylamino or sulphatoethylsulphonyl.

Useful structures containing radicals of Formula (5) include dyes of the formula:

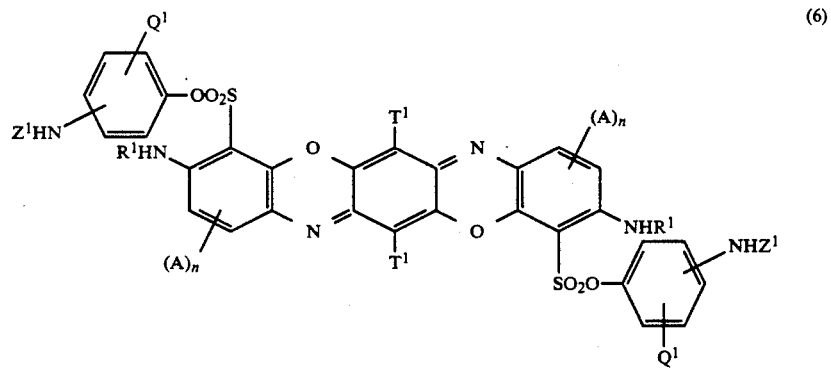
(6)

wherein $T^1$, $T^2$, A, n and $Q^1$ have the meanings given above, $R^1$ is hydrogen or an optionally substituted hydrocarbon radical, for example sulphatoethyl and $Z^1$ is a heterocyclic fibre-reactive group, for example monohalogenotriazinyl.

Other useful structures include dyes of the formula:

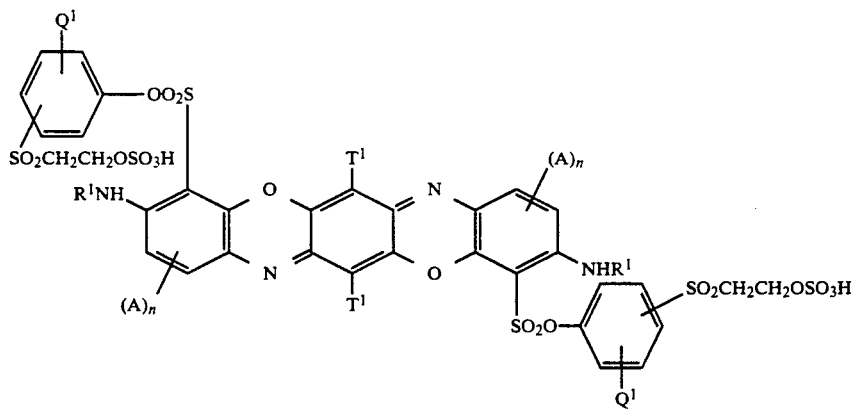

(7)

wherein $T^1$, $T^2$, A, n and $Q^1$ have the meanings given above and $R^1$ is hydrogen or an optionally substituted hydrocarbon radical, for example a radical of the formula:

$$-X-NR^3-Z^1 \tag{8}$$

wherein X, $R^3$ and $Z^1$ have the meanings given above.

The dyes of the invention may be prepared by reactions conventional to triphenodioxazine chemistry. For example, a sulphonchloride of the formula:

(9)

may be reacted with a hydroxy compound of the formula:

$$R^2OH \tag{10}$$

to form a chloronitrobenzene sulphonate ester which is reacted with an amine of the formula:

$$R^1NH_2 \tag{11}$$

and reduced to give a compound of the formula:

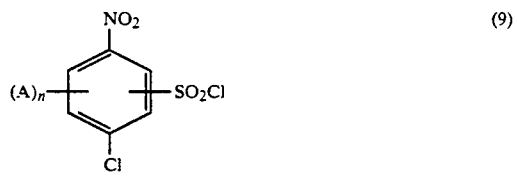

(12)

which is then reacted in conventional manner with the appropriate 1,4-benzoquinone derivative to form a dianilide of the formula:

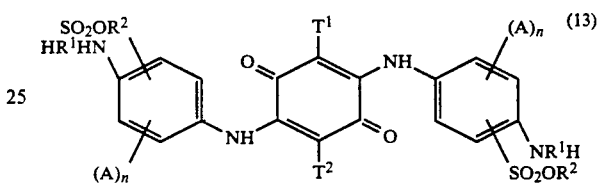

(13)

wherein $R^1$, $R^2$, $T^1$, $T^2$, A and n are as defined above. The dianilide may then be cyclised in the presence of a strongly acid condensing agent, for example oleum, to form the triphenodioxazine. Sulphonic acid groups may be introduced into the dianilide during cyclisation, for example into any aryl groups represented by $R^2$.

Fibre-reactive groups may be introduced into the dye in conventional manner, for example by reacting a diaminotriphenodioxazine with cyanuric chloride or its primary condensation products with ammonia, primary and secondary amines, alcohols and mercaptans.

The dyes prepared as described above may be isolated by any conventional means, for example by spray drying or precipitation and filtration.

The dyes contain sulphonic acid groups which confer water-solubility and they may be isolated with such groups in the free acid form. However, it is usually found more convenient to isolate the dyes in the form of salts particularly alkali metal salts, especially sodium.

The dyes of the present invention may be used for colouring a wide range of textile materials containing hydroxyl or amino groups, e.g. wool, silk, synthetic polyamides and natural or regenerated cellulose, for example cotton or viscose rayon materials, by conventional methods used for colouring such materials with water-soluble reactive dyes, e.g. in the case of cellulose they are preferably applied in conjunction with a treatment with an acid binding agent, e.g. caustic soda, sodium carbonate, phosphate, silicate or bicarbonate, which may be applied to the cellulose textile materials before, during or after the application of the dye.

The dyes of the present invention are valuable reactive dyes for cellulose. They yield bright blue coloured textiles with good resistance to washing, chlorine and light. They are usually characterised by good strength and an ability to build-up to high depths of shade.

The invention is illustrated but not limited by the following Examples in which all parts and percentages are by weight unless otherwise indicated.

EXAMPLE 1

Part A (1) Phenyl-6-chloro-3-nitrobenzenesulphonate

To 37.6 parts of phenol stirring in 780 parts water at pH 9.0 and at 5°–10° C. was added 100 parts 6-chloro-3-nitrobenzenesulphonyl chloride. A few drops of Calsolene oil wetting agent were added and the mixture was stirred at pH 9.5°–10° and 5°–10° C. for 3.5 hours, cooled and filtered. The solid was washed with cold water, and dried to give 116 parts of the desired product.

Similar compounds are obtained if the phenol used in this example is replaced by an equivalent amount of any of the following:
2-methylphenol
3-methylphenol
4-methylphenol
2-ethylphenol
2,4-dimethylphenol
2,5-dimethylphenol
3,4-dimethylphenol
2,6-dimethylphenol
3,5-dimethylphenol
2-methoxyphenol
3-methoxyphenol
4-methoxyphenol
2-methoxy-5-methylphenol
2-methoxy-4-methylphenol
2-ethoxyphenol
4-ethoxyphenol
2,4-dimethoxyphenol
2,5-dimethoxyphenol
3,4-dimethoxyphenol
2,6-dimethoxyphenol
3,5-dimethoxyphenol
2-chlorophenol
3-chlorophenol
4-chlorophenol
4-chloro-2-methylphenol
4-chloro-3-methylphenol
3-chloro-5-methoxyphenol
2-chloro-5-methylphenol
2,4-dichlorophenol
2,5-dichlorophenol
2,6-dichlorophenol
3,4-dichlorophenol
2,4,6-trichlorophenol
2-bromophenol
3-bromophenol
4-bromophenol
2,4-dibromophenol
2,5-dibromophenol
2,6-dibromophenol
3,4-dibromophenol
2,4,6-tribromophenol
3-aminophenol
3-acetylaminophenol
4-aminophenol
4-acetylaminophenol (2) Phenyl-6-aminoethylamino-3-nitro-benzenesulphonate To 64 parts of phenyl-6-chloro-3-nitro-benzenesulphonate in 900 parts of ethanol at 50° C. was added 74 parts of ethylenediamine and the reaction mixture heated at 55°–60° C., with stirring, for 4 hours then cooled in ice. The yellow precipitate so formed was collected by filtration, washed with ethanol and dried in air to give 48 parts of the product.

Similar compounds are obtained if the ethylene diamine used in this example is replaced by an equivalent amount of any of the following:
1,2- and 1,3-propylene diamine
2-hydroxy-1,3-propylene diamine
1- and 2-phenyl-1,3-propylene diamine
2-(4'-sulphophenyl)-1,3-propylene diamine
1,4-, 2,3- and 2,4-butylene diamine
2-methyl-1,3-propylene diamine
2-methyl-2,4-propylene diamine
2-methyl-2,4-pentylene diamine
2,2-dimethyl-1,3-propylene diamine
1-phenylethylene diamine
1-chloro-2,3-propylene diamine
1,6- and 2,5-hexylene diamine
2,3-diphenyl-1,4-butylene diamine
1-(methoxycarbonyl)-1,5-pentylene diamine
1-carboxy-1,5-pentylene diamine
2,7-heptylene diamine
3-methyl-1,6-hexylene diamine
2,2'-diaminodiethyl ether
2,2'-diaminodiethyl sulphide
2,2'-diaminodiethyl disulphide
1,4-phenylene diamine
3-aminobenzylamine
1,4-bis(aminomethyl)benzene
1,3-bis(aminomethyl)benzene.

(3) Sulphophenyl-6-aminoethylamino-3-nitro-benzenesulphonate 3.4 parts of phenyl-6-aminoethylamino-3-nitrobenzenesulphonate was added to 170 parts of oleum (5%), at 0°–5° C., and the solution stirred for 2 hours whilst the temperature was allowed to rise to 16° C. then drowned into ice/water. The solid so formed was collected by filtration, washed acid free with water and dried to give 4 parts of the desired sulphonated product.

(4) 2,5-bis(4'-aminoethylamino-3'-p-sulphophenylsulphonato)anilino-3,6-dichloro-benzoquinone.

A solution of 5 parts of the above sulphophenyl-6-aminoethylamino-3-nitrobenzenesulphonate in 72 parts of ethanol and 48 parts of water was hydrogenated at room temperature and atmospheric pressure over palladium catalyst. The resulting solution was filtered to remove the catalyst and the ethanol was removed under reduced pressure. The pH was adjusted to 6–7 and 1.5 parts of chloranil added. The reaction mixture was heated at 50°–55° C. with stirring for 3 hours, cooled and filtered. The dark brown solid was washed with cold water and acetone, then dried to give 4.3 parts of the desired product.

(5) 3,10-Bis-aminoethylamino-6,13-dichloro-4,11-sulphophenylsulphonato-triphendioxazine.

To 65 parts of oleum (20%) and 11 parts of oleum (65%) at room temperature was added in turn, 4.3 parts of 2,5-bis(4'-aminoethylamino-3'-p-sulphophenylsulphonato)anilino-3,6-dichlorobenzoquinone and 2.6 parts of ammonium persulphate. The reaction mixture was heated to 30°, stirred at this temperature for 2 hours, cooled and drowned into ice water and filtered. The solid was washed acid free with water and dried to give 6.1 parts of the desired dyebase, which gave lambda max.570, 600sh,nm. in aqueous medium. The dyebase is believed to have structure (I):

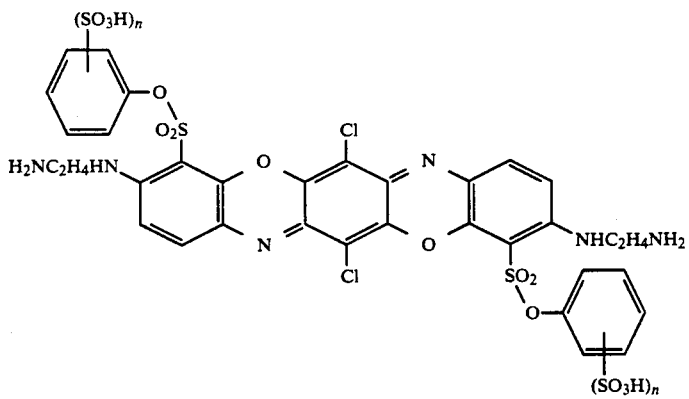

(I)

n = 1 or 2.

Part B

To 3.8 parts of aniline 2,5-disulphonic acid stirring in 35 parts water at pH 7 was added 0.1 parts of mixed phosphate buffer. After cooling to 0°–5° C. 2.4 parts of cyanuric chloride was added and the mixture stirred at 0°–5° C. and pH 6–7 until dissolved. After screening, this solution was added to a solution of 3.8 parts of the above dyebase dissolved in 210 parts of water at pH 9–10. The reaction mixture was heated to 50°–55° C. at pH 8.5–9.0 for 2 hours, salted to 35% w/v with sodium chloride/potassium chloride and filtered. The product was washed with brine and dried to give 12.6 parts of the desired reactive dyestuff which dyes cellulose textile materials in bright reddish blue shades.

Part C 4 parts of cyanuric chloride and a few drops of Calsolene oil were added to 7.3 parts of the above dyebase dissolved in 600 parts of water at 10°–20° C. The mixture was stirred at 10°–20° C. and pH 6–7 for 2 hours, then warmed to 40° C. for 2 hours. 20 parts of aniline-2,5-disulphonic acid dissolved in 100 parts of water were added and the pH adjusted to pH 7–8. The mixture was stirred overnight at 45° C., salted to 30% w/v with sodium chloride and filtered. The product was washed with brine and dried to give 16.6 parts of the same reactive dyestuff described in Part B.

Similar dyestuffs are obtained if the aniline-2,5-disulphonic acid used in Example 1B is replaced by an equivalent amount of the following amines:

| Example | Amine |
| --- | --- |
| 2 | 2-carboxyaniline-4,5-disulphonic acid |
| 3 | metanilic acid |
| 4 | aniline-3,5-disulphonic acid |
| 5 | N-sulphomethylaniline |
| 6 | aniline-2,4-disulphonic acid |
| 7 | 2-carboxyaniline-4-sulphonic acid |
| 8 | 3-aminoaniline-4-sulphonic acid |
| 9 | 4-aminoaniline-3-sulphonic acid |
| 10 | 3-aminoaniline-4,6-disulphonic acid |
| 11 | 4-aminoaniline-2,5-disulphonic acid |
| 12 | sulphanilic acid |
| 13 | orthanilic acid |
| 14 | 1-aminonaphthalene-6-sulphonic acid |
| 15 | 1-aminonaphthalene-7-sulphonic acid |
| 16 | 2-aminonaphthalene-5,7-disulphonic acid |
| 17 | 2-aminonaphthalene-6,8-disulphonic acid |
| 18 | 2-aminonaphthalene-8-sulphonic acid |
| 19 | 2-aminonaphthalene-7-sulphonic acid |
| 20 | 1-aminonaphthalene-3,8-disulphonic acid |
| 21 | 1-aminonaphthalene-3,6,8-trisulphonic acid |
| 22 | 2-methylaniline-5-sulphonic acid |
| 23 | 4-chloroaniline-3-sulphonic acid |

Following the procedure in Example 1, similar dyestuffs are obtained if the 2,4-dichloro-6-arylamino-s-triazines used in Examples 2–23 are replaced by equivalent amounts of the following acylating agents.

| Example | Acylating Agent |
| --- | --- |
| 24 | 2,4-dichloro-6-beta-hydroxethylamino-s-triazine |
| 25 | 2,4-dichloro-6-di-beta-hydroxyethylamino-s-triazine |
| 26 | 2,4-dichloro-6-beta-hydroxypropylamino-s-triazine |
| 27 | 2,4-dichloro-6-methoxy-s-triazine |
| 28 | 2,4-dichloro-6-amino-s-triazine |
| 29 | 2,4-dichloro-6-methylamino-s-triazine |
| 30 | 2,3-dichloroquinoxaoline-6-sulphonyl chloride |
| 31 | 2,4,5,6-tetrachloropyrimidine |
| 32 | 2,4,6-trichloro-s-triazine |
| 33 | 2,4-dichloro-6-n-butoxy-s-triazine |
| 34 | 2,4-dichloro-6-dimethylamino-s-triazine |
| 35 | 2,4,6-trichloropyrimidine |
| 36 | 1,4-dichlorophthalazine-6-carbonyl chloride |
| 37 | 2,4,6-trichloro-5-cyanopyrimidine |
| 38 | 2,4-dichloro-6-p-sulphophenoxy-s-triazine |
| 39 | 2,4,6-trifluoro-5-chloropyrimidine |
| 40 | 1-(4'-chlorocarbonylphenyl)-4,5-dichloro-6-pyridazone |
| 41 | 2,4,6-tribromopyrimidine |
| 42 | 2,4-dichloro-6-beta-sulphatoethylamino-s-triazine |
| 43 | 2-(2',4'-dichloro-s-triazinylamino)-5-(2'-chloro-4'-m-sulphoanilino-s-triazinylamino)benzene sulphonic acid |
| 44 | 2-(2',4'-dichloro-s-triazinylamino)-5-(2'-chloro-4'-amino-s-triazinylamino)benzene sulphonic acid |
| 45 | 2-(2',4'-dichloro-s-triazinylamino)-5-(2'-chloro-4'-(3'',5''-disulphoanilino)-s-triazinylamino)benzene sulphonic acid |
| 46 | 2-(2',4'-dichloro-s-triazinylamino)-4-(2'-chloro-4'-m-sulphoanilino-s-triazinylamino)benzene-1,5-disulphonic acid |
| 47 | 2-(2',4'-dichloro-s-triazinylamino)-4-(2'-chloro-4'-amino-s-triazinylamino)benzene-1,5-disulphonic acid |
| 48 | 2-(2',4'-dichloro-s-triazinylamino)-4-[2'-chloro-4'-(3'',5''-disulphoanilino)-s-triazinylamino]benzene-1,5-disulphonic acid |
| 49 | 2-(2',4'-dichloro-s-triazinylamino)-4-[2'-chloro-4'-(2'',5''-disulphoanilino)-s-triazinylamino]benzene-1,5-disulphonic acid |
| 50 | 2-(2',4'-dichloro-s-triazinylamino)-5-(2'-chloro-4'-methoxy-s-triazinylamino)benzene-1,4-disulphonic acid |
| 51 | 2-(2',4'-dichloro-s-triazinylamino)-5-(2'-chloro-4'-amino-s-triazinylamino)benzene-1,4-disulphonic acid |
| 52 | 2-(2',4'-dichloro-s-triazinylamino)-5-[2'-chloro-4'-(m-sulphoanilino)-s-triazinylamino]benzene-1,4-disulphonic acid |
| 53 | 2-(2',4'-dichloro-s-triazinylamino)-5-[2'-chloro- |

| Example | Acylating Agent |
|---|---|
| | 4'-(3",5"-disulphoanilino)-s-triazinylamino]benzene-1,4-disulphonic acid |
| 54 | 2-(2',4'-dichloro-s-triazinylamino)-5-[2'-chloro-4'-(2",5"-disulphoanilino)-s-triazinylamino]benzene-1,4-disulphonic acid |
| 55 | 2-(2',4'-dichloro-s-triazinylamino)-5-[2'-chloro-4'-(4"-sulphoanilino)-s-triazinylamino]benzene-1,4-disulphonic acid |
| 56 | 2-(2',4'-dichloro-s-triazinylamino)-5-[2'-chloro-4'-(2",4"-disulphoanilino)-s-triazinylamino]benzene-1,4-disulphonic acid |
| 57 | 2-(2',4'-dichloro-s-triazinylamino)-5-[2'-bromo-4'-(2",4"-disulphoanilino)-s-triazinylamino]benzene-1,4-disulphonic acid |
| 58 | 2-(2',4'-dichloro-s-triazinylamino)-5-[2'-chloro-4'-(2"-methyl-5"-sulphoanilino)-s-triazinylamino]benzene-1,4-disulphonic acid |
| 59 | 2-(2',4'-dichloro-s-triazinylamino)-5-[2'-chloro-4'-(o-sulphoanilino)-s-triazinylamino]benzene-1,4-disulphonic acid |
| 60 | 2-(2',4'-dichloro-s-triazinylamino)-5-[2'-chloro-4'-(N"-sulphomethylanilino)-s-triazinylamino]benzene-1,4-disulphonic acid |
| 61 | 2-(2',4'-dichloro-s-triazinylamino)-5-[2'-chloro-4'-(3",6",8"-trisulphonaphthyl-1"-amino)-s-triazinylamino]benzene-1,4-disulphonic acid |
| 62 | 2-(2',4'-dichloro-s-triazinylamino)-5-[2'-chloro-4'-(4",6",8"-trisulphonaphthyl-2"-amino)-s-triazinylamino]benzene-1,4-disulphonic acid |
| 63 | 2-(2',4'-dichloro-s-triazinylamino)-5-[2'-chloro-4'-(N"-methyl-3"-sulphoanilino)-s-triazinylamino]benzene-1,4-disulphonic acid |
| 64 | 2-(2',4'-dichloro-s-triazinylamino)-5-[2'-chloro-4'-(2"-methyl-4",5"-disulphoanilino)-s-triazinylamino]benzene-1,4-disulphonic acid |
| 65 | 2-(2',4'-dichloro-s-triazinylamino)-5-[2'-chloro-4-sulphomethylamino-s-triazinylamino]benzene-1,4-disulphonic acid |
| 66 | 2-(2',4'-dichloro-s-triazinylamino)-6-[2'-chloro-4'-(3",6",8"-trisulphonaphthyl-1"-amino)-s-triazinylamino]naphthalene-4,8-disulphonic acid |
| 67 | 2-(2',4'-dichloro-s-triazinylamino)-6-[2'-chloro-4'-(3",5"-disulphoanilino)-s-triazinylamino]naphthalene-4,8-disulphonic acid |
| 68 | 2-(2',4'-dichloro-s-triazinylamino)-6-[2'-chloro-4'-(4",6",8"-trisulphonaphthyl-2"-amino)-s-triazinylamino]naphthalene-4,8-disulphonic acid |
| 69 | 1-(2',4'-dichloro-s-triazinylamino)-5-[2'-chloro-4'-(3",6",8"-trisulphonaphthyl-1"-amino)-s-triazinylamino]naphthalene-3,7-disulphonic acid |

EXAMPLE 70

If 4-methylphenol is used in place of phenol in Example 1, a dyebase is obtained which is believed to have structure (II):

When condensed with 2,4-dichloro-6-(2',5'-disulphophenyl)amino-s-triazine in a similar manner to Example 1B, a product is obtained which dyes cellulose textile materials in bright reddish blue shades. Similar dyestuffs are obtained if the aniline 2,5-disulphonic acid used in Example 70 is replaced by equivalent amounts of the following amines:

| Example | Amine |
|---|---|
| 71 | aniline-2,4-disulphonic acid |
| 72 | 2-carboxyaniline-4-sulphonic acid |
| 73 | 3-aminoaniline-4-sulphonic acid |
| 74 | 4-aminoaniline-3-sulphonic acid |
| 75 | 3-aminoaniline-4,6-disulphonic acid |
| 76 | 4-aminoaniline-2,5-disulphonic acid |
| 77 | sulphanilic acid |
| 78 | orthanilic acid |
| 79 | 1-aminonaphthalene-6-sulphonic acid |
| 80 | 1-aminonaphthalene-7-sulphonic acid |

Following the procedure in Example 1, similar dyestuffs are obtained if the 2,4-dichloro-6-arylamino-s-triazines used in Examples 71-77 are replaced by equivalent amounts of the following acylating agents:

| Example | Acylating Agent |
|---|---|
| 81 | 2-(2',4'-dichloro-s-triazinylamino)-4-(2'-chloro-4'-amino-s-triazinylamino)benzene-1,5-disulphonic acid |
| 82 | 2-(2',4'-dichloro-s-triazinylamino)-4-[2'-chloro-4'-(3",5"-disulphoanilino)-s-triazinylamino]benzene-1,5-disulphonic acid |
| 83 | 2-(2',4'-dichloro-s-triazinylamino)-4-[2'-chloro-4'-(2",5"-disulphoanilino)-s-triazinylamino]benzene-1,5-disulphonic acid |
| 84 | 2-(2',4'-dichloro-s-triazinylamino)-5-(2'-chloro-4'-methoxy-s-triazinylamino)benzene-1,4-disulphonic acid |
| 85 | 2-(2',4'-dichloro-s-triazinylamino)-5-(2'-chloro-4'-amino-s-triazinylamino)benzene-1,4-disulphonic acid |
| 86 | 2-(2',4'-dichloro-s-triazinylamino)-5-[2'-chloro-4'-(m-sulphoanilino)-s-triazinylamino]benzene-1,4-disulphonic acid |
| 87 | 2-(2',4'-dichloro-s-triazinylamino)-5-[2'-chloro-4'-(3",5"-disulphoanilino)-s-triazinylamino)benzene-1,4-disulphonic acid |

EXAMPLE 88

If 4-methoxyphenol is used in place of phenol in Example 1, a dyebase is obtained which is believed to have structure (III):

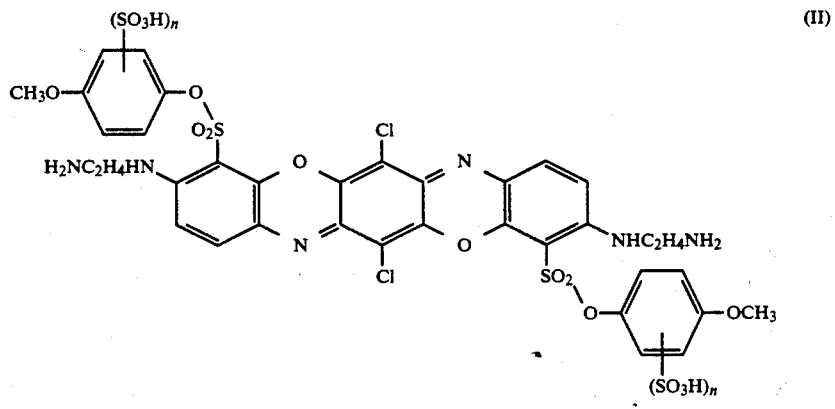

(II)

n = 1 or 2

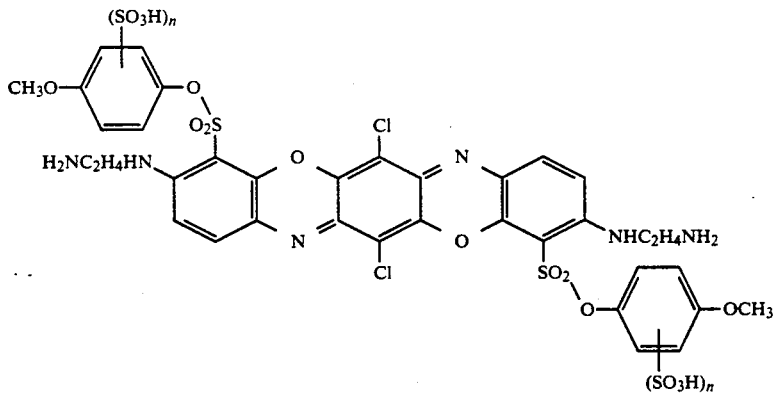

n = 1 or 2

When condensed with 2,4-dichloro-6-(2',5'-disulphophenyl)amino-s-triazine in a similar manner to Example 1B, a product is obtained which dyes cellulose textile materials in bright reddish blue shades. Similar dyestuffs are obtained if the aniline 2,5-disulphonic acid used in Example 88 is replaced by equivalent amounts of the following amines:

| Example | Amine |
|---|---|
| 89 | aniline-2,4-disulphonic acid |
| 90 | 2-carboxyaniline-4-sulphonic acid |
| 91 | 3-aminoaniline-4-sulphonic acid |
| 92 | 4-aminoaniline-3-sulphonic acid |
| 93 | 3-aminoaniline-4,6-disulphonic acid |
| 94 | 4-aminoaniline-2,5-disulphonic acid |
| 95 | sulphanilic acid |
| 96 | orthanilic acid |
| 97 | 1-aminonaphthalene-6-sulphonic acid |
| 98 | 1-aminonaphthalene-7-sulphonic acid |

Following the procedure in Example 1, similar dyestuffs are obtained if the 2,4-dichloro-6-arylamino-s-triazines used in Examples 89-95 are replaced by equivalent amounts of the following acylating agents:

| Example | Acylating Agent |
|---|---|
| 99 | 2-(2',4'-dichloro-s-triazinylamino)-4-(2'-chloro-4'-amino-s-triazinylamino)benzene-1,5-disulphonic acid |
| 100 | 2-(2',4'-dichloro-s-triazinylamino)-4-[2'-chloro-4'-(3'',5''-disulphoanilino)-s-triazinylamino]benzene-1,5-disulphonic acid |
| 101 | 2-(2',4'-dichloro-s-triazinylamino)-4-[2'-chloro-4'-(2'',5''-disulphoanilino)-s-triazinylamino]benzene-1,5-disulphonic acid |
| 102 | 2-(2',4'-dichloro-s-triazinylamino)-5-(2'-chloro-4'-methoxy-s-triazinylamino)benzene-1,4-disulphonic acid |
| 103 | 2-(2',4'-dichloro-s-triazinylamino)-5-(2'-chloro-4'-amino-s-triazinylamino)benzene-1,4-disulphonic acid |
| 104 | 2-(2',4'-dichloro-s-triazinylamino)-5-[2'-chloro-4'-(m-sulphoanilino)-s-triazinylamino]benzene-1,4-disulphonic acid |
| 105 | 2-(2',4'-dichloro-s-triazinylamino)-5-[2'-chloro-4'-(3'',5''-disulphoanilino)-s-triazinylamino)benzene-1,4-disulphonic acid |

EXAMPLE 106

If 3,4-dichlorophenol is used in place of phenol in Example 1, a dyebase is obtained which is believed to have structure (IV):

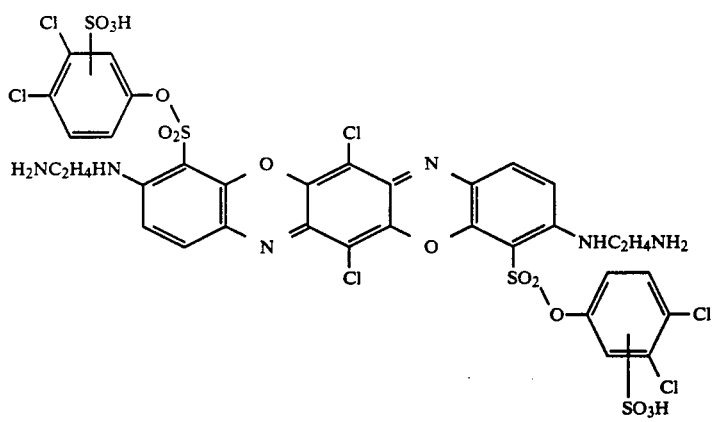

(IV)

When condensed with 2,4-dichloro-6-(2',5'-disulphophenyl)amino-s-triazine in a similar manner to Example 1B, a product is obtained which dyes cellulose textile materials in bright reddish blue shades. Similar dyestuffs are obtained if the aniline 2,5-disulphonic acid used in Example 106 is replaced by equivalent amounts of the following amines:

| Example | Amine |
|---|---|
| 107 | aniline-2,4-disulphonic acid |
| 108 | 2-carboxyaniline-4-sulphonic acid |
| 109 | 3-aminoaniline-4-sulphonic acid |

-continued

| Example | Amine |
|---|---|
| 110 | 4-aminoaniline-3-sulphonic acid |
| 111 | 3-aminoaniline-4,6-disulphonic acid |
| 112 | 4-aminoaniline-2,5-disulphonic acid |
| 113 | sulphanilic acid |
| 114 | orthanilic acid |
| 115 | 1-aminonaphthalene-6-sulphonic acid |
| 116 | 1-aminonaphthalene-7-sulphonic acid |

Following the procedure in Example 1, similar dyestuffs are obtained if the 2,4-dichloro-6-arylamino-s-triazines used in Examples 107–113 are replaced by equivalent amounts of the following acylating agents:

| Example | Acylating Agent |
|---|---|
| 17 | 2-(2',4'-dichloro-s-triazinylamino)-4-(2'-chloro-4'-amino-s-triazinylamino)benzene-1,5-disulphonic acid |
| 118 | 2-(2',4'-dichloro-s-triazinylamino)-4-[2'-chloro-4'-(3'',5''-disulphoanilino)-s-triazinylamino]benzene-1,5-disulphonic acid |
| 119 | 2-(2',4'-dichloro-s-triazinylamino)-4-[2'-chloro-4'-(2'',5''-disulphoanilino)-s-triazinylamino]benzene-1,5-disulphonic acid |
| 120 | 2-(2',4'-dichloro-s-triazinylamino)-5-(2'-chloro-4'-methoxy-s-triazinylamino)benzene-1,4-disulphonic acid |
| 121 | 2-(2',4'-dichloro-s-triazinylamino)-5-(2'-chloro-4'-amino-s-triazinylamino)benzene-1,4-disulphonic acid |
| 122 | 2-(2',4'-dichloro-s-triazinylamino)-5-[2'-chloro-4'-(m-sulphoanilino)-s-triazinylamino]benzene-1,4-disulphonic acid |
| 123 | 2-(2',4'-dichloro-s-triazinylamino)-5-[2'-chloro-4'-(3'',5''-disulphoanilino)-s-triazinylamino)benzene-1,4-disulphonic acid |

EXAMPLE 124

If 3,4-dimethylphenol is used in place of phenol and 2-methyl-1,3-propylene diamine is used in place of ethylene diamine in Example 1, a dyebase is obtained which is believed to have structure (V):

When condensed with 2,4-dichloro-6-(2',5'-disulphophenyl)amino-s-triazine in a similar manner to Example 1B, a product is obtained which dyes cellulose textile materials in bright reddish blue shades. Similar dyestuffs are obtained if the aniline 2,5-disulphonic acid used in Example 124 is replaced by equivalent amounts of the following amines:

| Example | Amine |
|---|---|
| 125 | aniline-2,4-disulphonic acid |
| 126 | 2-carboxyaniline-4-sulphonic acid |
| 127 | 3-aminoaniline-4-sulphonic acid |
| 128 | 4-aminoaniline-3-sulphonic acid |
| 129 | 3-aminoaniline-4,6-disulphonic acid |
| 130 | 4-aminoaniline-2,5-disulphonic acid |
| 131 | sulphanilic acid |
| 132 | orthanilic acid |
| 133 | 1-aminonaphthalene-6-sulphonic acid |
| 134 | 1-aminonaphthalene-7-sulphonic acid |
| 135 | metanilic acid |

Following the procedure in Example 1, similar dyestuffs are obtained if the 2,4-dichloro-6-arylamino-s-triazines used in Examples 125–130 are replaced by equivalent amounts of the following phenylating agents:

| Example | Phenylating Agent |
|---|---|
| 136 | 2,4-dicyano-3,5-difluoro-6-chlorobenzene |
| 137 | 2,4-dicyano-3,5-difluoro-6-nitrobenzene |
| 138 | 2,4-dicyano-3,5,6-trifluorobenzene |
| 139 | 2,4-dicyano-3,5,6-trichlorobenzene |
| 140 | 2,4,6-tricyano-3,5-difluorobenzene |
| 141 | 2,4,6-tricyano-3,5-dichlorobenzene |

EXAMPLE 142

If 2,4-dichlorophenol is used in place of phenol and 2-chloromethyl-1,3-propylene diamine is used in place of ethylene diamine in Example 1, a dyebase is obtained which is believed to have structure (VI):

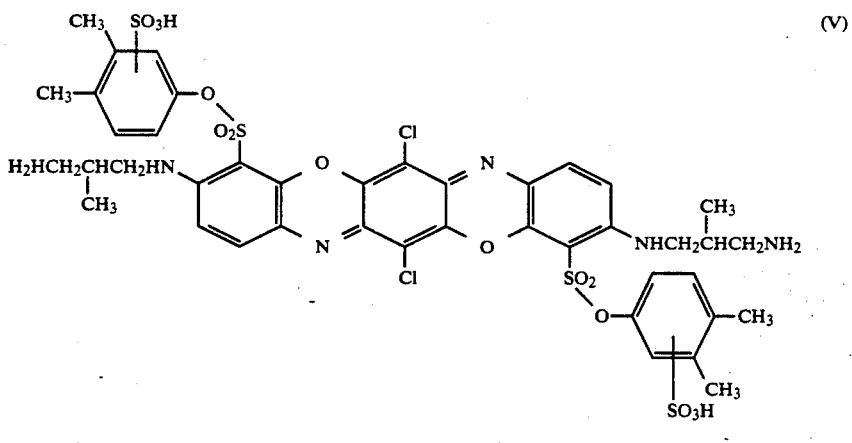

(V)

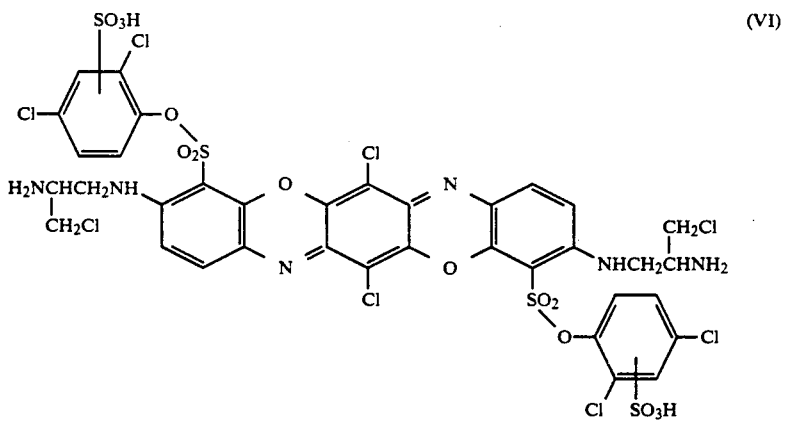

(VI)

When condensed with 2,4-dichloro-6-(2',5'-disulphophenyl)amino-s-triazine in a similar manner to Example 1B, a product is obtained which dyes cellulose textile materials in bright reddish blue shades. Similar dyestuffs are obtained if the aniline 2,5-disulphonic acid used in Example 142 is replaced by equivalent amounts of the following amines:

| Example | Amine |
|---|---|
| 143 | orthanilic acid |
| 144 | 1-aminonaphthalene-6-sulphonic acid |
| 145 | 1-aminonaphthalene-7-sulphonic acid |
| 146 | 2-aminonaphthalene-5,7-disulphonic acid |
| 147 | 2-aminonaphthalene-6,8-disulphonic acid |
| 148 | 2-aminonaphthalene-8-sulphonic acid |
| 149 | 2-aminonaphthalene-7-sulphonic acid |
| 150 | 1-aminonaphthalene-3,8-disulphonic acid |
| 151 | 1-aminonaphthalene-3,6,8-trisulphonic acid |
| 152 | 2-methylaniline-5-sulphonic acid |
| 153 | 4-chloroaniline-3-sulphonic acid |
| 154 | metanilic acid |

Following the procedure in Example 1, similar dyestuffs are obtained if the 2,4-dichloro-6-arylamino-s-triazines used in Examples 143-153 are replaced by equivalent amounts of the following acylating agents:

| Example | Acylating Agent |
|---|---|
| 155 | 2,4,6-trichloro-5-cyanopyrimidine |
| 156 | 2,4-dichloro-6-p-sulphophenoxy-s-triazine |
| 157 | 2,4,6-trifluoro-5-chloropyrimidine |
| 158 | 1-(4'-chlorocarbonylphenyl)-4,5-dichloro-6-pyridazone |
| 159 | 2,4,6-tribromopyrimidine |
| 160 | 2,4-dichloro-6-beta-sulphatoethylamino-s-triazine |
| 161 | 2-(2',4'-dichloro-s-triazinylamino-5-(2'-chloro-4'-m-sulphoanilino-s-triazinylamino)benzene sulphonic acid |
| 162 | 2-(2',4'-dichloro-s-triazinylamino)-5-(2'-chloro-4'-amino-s-triazinylamino)benzene sulphonic acid |
| 163 | 2-(2',4'-dichloro-s-triazinylamino)-5-(2'-chloro-4'-(3'',5''-disulphoanilino)-s-triazinylamino)benzene sulphonic acid |
| 164 | 2-(2',4'-dichloro-s-triazinylamino)-4-(2'-chloro-4'-m-sulphoanilino-s-triazinylamino)benzene-1,5-disulphonic acid |
| 165 | 2-(2',4'-dichloro-s-triazinylamino)-4-(2'-chloro-4'-amino-s-triazinylamino)benzene-1,5-disulphonic acid |

EXAMPLE 166

If 2,6-dimethylphenol is used in place of phenol and 2-hydroxy-1,3-propylene diamine is used in place of ethylene diamine in Example 1, a dyebase is obtained which is believed to have structure (VII):

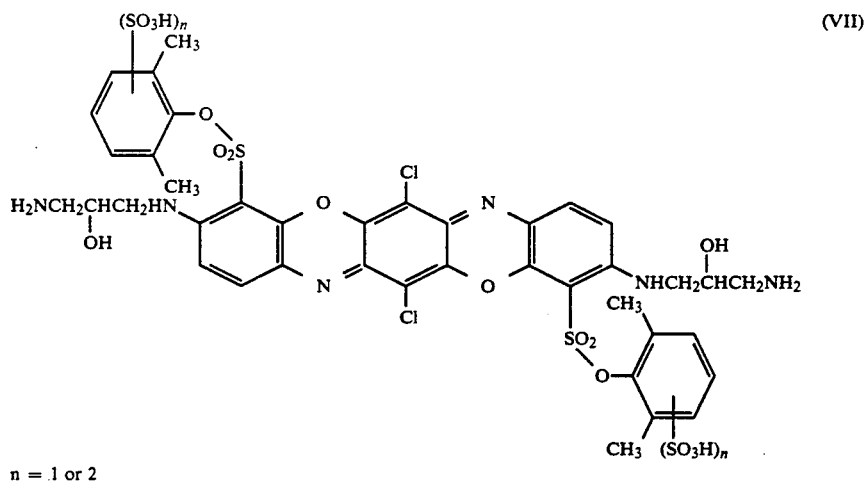

(VII)

n = 1 or 2

When condensed with 2,4-dichloro-6-(2',5'-disulphophenyl)amino-s-triazine in a similar manner to Example 1B, a product is obtained which dyes cellulose textile materials in bright reddish blue shades. Similar dyestuffs are obtained if the aniline 2,5-disulphonic acid used in Example 166 is replaced by equivalent amounts of the following amines:

| Example | Amine |
|---------|-------|
| 167 | orthanilic acid |
| 168 | 1-aminonaphthalene-6-sulphonic acid |
| 169 | 1-aminonaphthalene-7-sulphonic acid |
| 170 | 2-aminonaphthalene-5,7-disulphonic acid |
| 171 | 2-aminonaphthalene-6,8-disulphonic acid |
| 172 | 2-aminonaphthalene-8-sulphonic acid |
| 173 | 2-aminonaphthalene-7-sulphonic acid |
| 174 | 1-aminonaphthalene-3,8-disulphonic acid |
| 175 | 1-aminonaphthalene-3,6,8-trisulphonic acid |
| 176 | 2-methylaniline-5-sulphonic acid |
| 177 | 4-chloroaniline-3-sulphonic acid |

Following the procedure in Example 1, similar dyestuffs are obtained if the 2,4-dichloro-6-arylamino-s-triazines used in Examples 167–177 are replaced by equivalent amounts of the following acylating agents:

| Example | Acylating Agent |
|---------|-----------------|
| 178 | 1,4-dichlorophthalazine-6-carbonyl chloride |
| 179 | 2,4,6-trichloro-5-cyanopyrimidine |
| 180 | 2,4-dichloro-6-p-sulphophenoxy-s-triazine |
| 181 | 2,4,6-trifluoro-5-chloropyrimidine |
| 182 | 1-(4'-chlorocarbonylphenyl)-4,5-dichloro-6-pyridazone |
| 183 | 2,4,6-tribromopyrimidine |
| 184 | 2,4-dichloro-6-beta-sulphatoethylamino-s-triazine |
| 185 | 2-(2',4'-dichloro-s-triazinylamino-5-(2'-chloro-4'-m-sulphoanilino-s-triazinylamino)benzene sulphonic acid |
| 186 | 2-(2',4'-dichloro-s-triazinylamino)-5-(2'-chloro-4'-amino-s-triazinylamino)benzene sulphonic acid |
| 187 | 2-(2',4'-dichloro-s-triazinylamino)-5-(2'-chloro-4'-(3'',5''-disulphoanilino)-s-triazinylamino)benzene sulphonic acid |
| 188 | 2-(2',4'-dichloro-s-triazinylamino)-4-(2'-chloro-4'-methoxy-s-triazinylamino)benzene-1,5-disulphonic acid |

EXAMPLE 189

If 2-methoxyphenol is used in place of phenol and 1,4-diaminomethylbenzene is used in place of ethylene diamine in Example 1, a dyebase is obtained which is believed to have structure (VIII):

1B, a product is obtained which dyes cellulose textile materials in bright reddish blue shades. Similar dyestuffs are obtained if the aniline 2,5-disulphonic acid used in Example 189 is replaced by equivalent amounts of the following amines:

| Example | Amine |
|---------|-------|
| 190 | orthanilic acid |
| 191 | 1-aminonaphthalene-6-sulphonic acid |
| 192 | 1-aminonaphthalene-7-sulphonic acid |
| 193 | 2-aminonaphthalene-5,7-disulphonic acid |
| 194 | 2-aminonaphthalene-6,8-disulphonic acid |
| 195 | 2-aminonaphthalene-8-sulphonic acid |
| 196 | 2-aminonaphthalene-7-sulphonic acid |
| 197 | 1-aminonaphthalene-3,8-disulphonic acid |
| 198 | 1-aminonaphthalene-3,6,8-trisulphonic acid |
| 199 | 2-methylaniline-5-sulphonic acid |
| 200 | 4-chloroaniline-3-sulphonic acid |

Following the procedure in Example 1, similar dyestuffs are obtained if the 2,4-dichloro-6-arylamino-s-triazines used in Examples 190–200 are replaced by equivalent amounts of the following acylating agents:

| Example | Acylating Agent |
|---------|-----------------|
| 201 | 1,4-dichlorophthalazine-6-carbonyl chloride |
| 202 | 2,4,6-trichloro-5-cyanopyrimidine |
| 203 | 2,4-dichloro-6-p-sulphophenoxy-s-triazine |
| 204 | 2,4,6-trifluoro-5-chloropyrimidine |
| 205 | 1-(4'-chlorocarbonylphenyl)-4,5-dichloro-6-pyridazone |
| 206 | 2,4,6-tribromopyrimidine |
| 207 | 2,4-dichloro-6-beta-sulphatoethylamino-s-triazine |
| 208 | 2-(2',4'-dichloro-s-triazinylamino-5-(2'-chloro-4'-m-sulphoanilino-s-triazinylamino)benzene sulphonic acid |
| 209 | 2-(2',4'-dichloro-s-triazinylamino)-5-(2'-chloro-4'-amino-s-triazinylamino)benzene sulphonic acid |
| 210 | 2-(2',4'-dichloro-s-triazinylamino)-5-(2'-chloro-4'-(3'',5''-disulphoanilino)-s-triazinylamino)benzene sulphonic acid |
| 211 | 2-(2',4'-dichloro-s-triazinylamino)-4-(2'-chloro-4'-m-sulphoanilino-s-triazinylamino)benzene-1,5-disulphonic acid |

EXAMPLE 212

If 4-bromophenol is used in place of phenol in Example 1, a dyebase is obtained which is believed to have structure (IX):

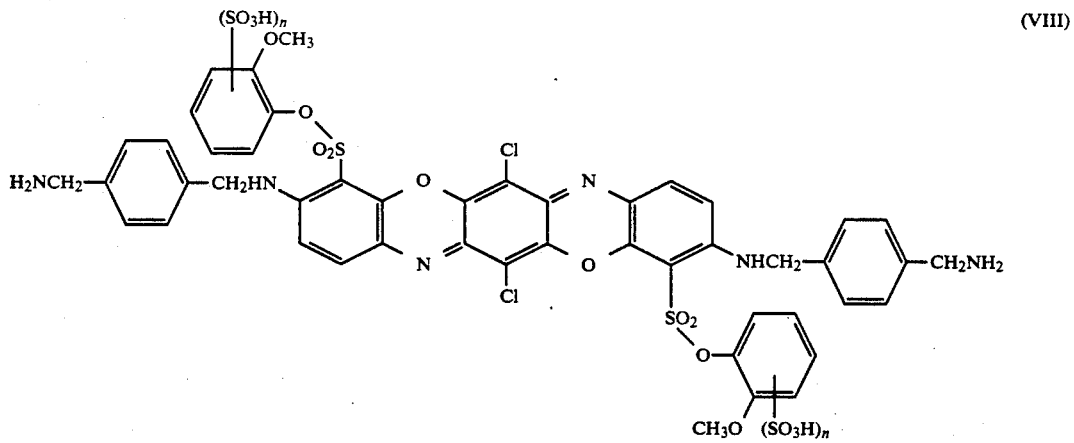

(VIII)

n = 1 or 2

When condensed with 2,4-dichloro-6-(2',5'-disulphophenyl)amino-s-triazine in a similar manner to Example (IX)

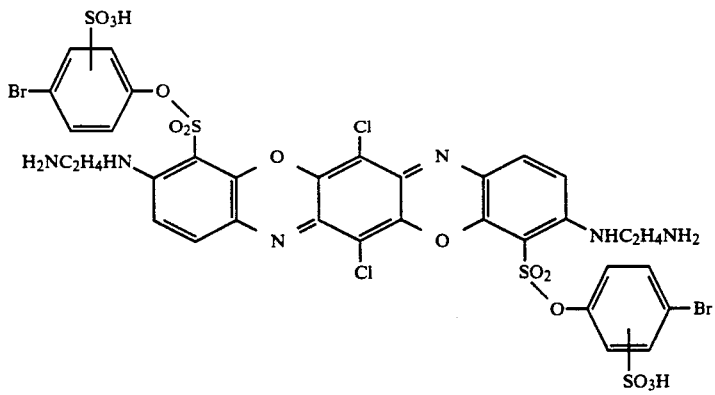

When condensed with 2,4-dichloro-6-(2',5'-disulphophenyl)amino-s-triazine in a similar manner to Example 1B, a product is obtained which dyes cellulose textile materials in bright reddish blue shades. Similar dyestuffs are obtained if the aniline 2,5-disulphonic acid used in Example 212 is replaced by equivalent amounts of the following amines:

| Example | Amine |
|---|---|
| 213 | orthanilic acid |
| 214 | 1-aminonaphthalene-6-sulphonic acid |
| 215 | 1-aminonaphthalene-7-sulphonic acid |
| 216 | 2-aminonaphthalene-5,7-disulphonic acid |
| 217 | 2-aminonaphthalene-6,8-disulphonic acid |
| 218 | 2-aminonaphthalene-8-sulphonic acid |
| 219 | 2-aminonaphthalene-7-sulphonic acid |
| 220 | 1-aminonaphthalene-3,8-disulphonic acid |
| 221 | 1-aminonaphthalene-3,6,8-trisulphonic acid |
| 222 | 2-methylaniline-5-sulphonic acid |
| 223 | 4-chloroaniline-3-sulphonic acid |

Following the procedure in Example 1, similar dyestuffs are obtained if the 2,4-dichloro-6-arylamino-s-triazines used in Examples 213-223 are replaced by equivalent amounts of the following acylating agents:

| Example | Acylating Agent |
|---|---|
| 224 | 1,4-dichlorophthalazine-6-carbonyl chloride |
| 225 | 2,4,6-trichloro-5-cyanopyrimidine |
| 226 | 2,4-dichloro-6-p-sulphophenoxy-s-triazine |
| 227 | 2,4,6-trifluoro-5-chloropyrimidine |
| 228 | 1-(4'-chlorocarbonylphenyl)-4,5-dichloro-6-pyridazone |
| 229 | 2,4,6-tribromopyrimidine |
| 230 | 2,4-dichloro-6-beta-sulphatoethylamino-s-triazine |
| 231 | 2-(2',4'-dichloro-s-triazinylamino-5-(2'-chloro-4'-m-sulphoanilino-s-triazinylamino)benzene sulphonic acid |
| 232 | 2-(2',4'-dichloro-s-triazinylamino)-5-(2'-chloro-4'-amino-s-triazinylamino)benzene sulphonic acid |
| 233 | 2-(2',4'-dichloro-s-triazinylamino)-5-(2'-chloro-4'-(3'',5''-disulphoanilino)-s-triazinylamino)benzene sulphonic acid |
| 234 | 2-(2',4'-dichloro-s-triazinylamino)-4-(2'-chloro-4'-m-sulphoanilino-s-triazinylamino)benzene-1,5-disulphonic acid |

EXAMPLE 235

If 2,4-dimethoxyphenol is used in place of phenol in Example 1, a dyebase is obtained which is believed to have structure (X):

(X)

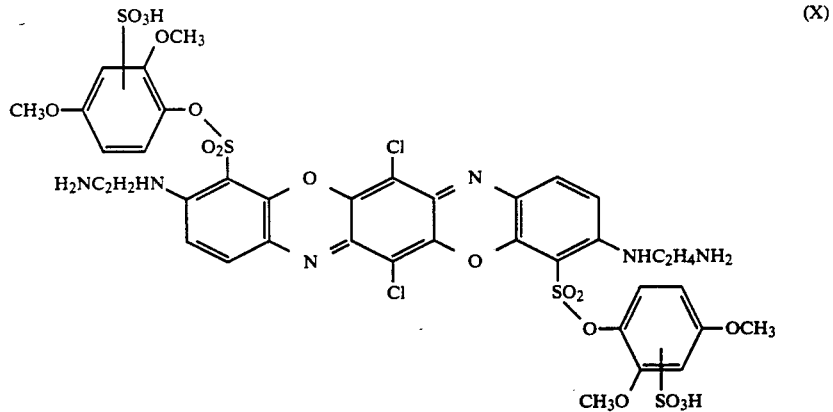

When condensed with 2,4-dichloro-6-(2',5'-disulphophenyl)amino-s-triazine in a similar manner to Example 1B, a product is obtained which dyes cellulose textile materials in bright reddish blue shades. Similar dyestuffs are obtained if the aniline 2,5-disulphonic acid used in Example 235 is replaced by equivalent amounts of the following amines:

| Example | Amine |
|---|---|
| 236 | 2-carboxyaniline-4,5-disulphonic acid |
| 237 | metanilic acid |
| 238 | aniline-3,5-disulphonic acid |
| 239 | N-sulphomethylaniline |
| 240 | aniline-2,4-disulphonic acid |

-continued

| Example | Amine |
|---|---|
| 241 | 2-carboxyaniline-4-sulphonic acid |
| 242 | 3-aminoaniline-4-sulphonic acid |
| 243 | 4-aminoaniline-3-sulphonic acid |
| 244 | 3-aminoaniline-4,6-disulphonic acid |
| 245 | 4-aminoaniline-2,5-disulphonic acid |
| 246 | sulphanilic acid |

Following the procedure in Example 1, similar dyestuffs are obtained if the 2,4-dichloro-6-arylamino-s-triazines used in Examples 236–246 are replaced by equivalent amounts of the following acylating agents:

| Example | Acylating Agent |
|---|---|
| 247 | 2,4-dichloro-6-beta-hydroxyethylamino-s-triazine |
| 248 | 2,4-dichloro-6-di-beta-hydroxyethylamino-s-triazine |
| 249 | 2,4-dichloro-6-beta-hydroxypropylamino-s-triazine |
| 250 | 2,4-dichloro-6-methoxy-s-triazine |
| 251 | 2,4-dichloro-6-amino-s-triazine |
| 252 | 2,4-dichloro-6-methylamino-s-triazine |
| 253 | 2,3-dichloroquinoxaline-6-sulphonyl chloride |
| 254 | 2,4,5,6-tetrachloropyrimidine |
| 255 | 2,4-dichloro-6-n-butoxy-s-triazine |
| 256 | 2,4-dichloro-6-dimethylamino-s-triazine |
| 257 | 2,4,6-trichloropyrimidine |

EXAMPLE 258

If 2-methoxy-4-methylphenol is used in place of phenol in Example 1, a dyebase is obtained which is believed to have structure (XI):

Example 258 is replaced by equivalent amounts of the following amines:

| Example | Amine |
|---|---|
| 259 | 2-carboxyaniline-4,5-disulphonic acid |
| 260 | metanilic acid |
| 261 | aniline-3,5-disulphonic acid |
| 262 | N-sulphomethylaniline |
| 263 | aniline-2,4-disulphonic acid |
| 264 | 2-carboxyaniline-4-sulphonic acid |
| 265 | 3-aminoaniline-4-sulphonic acid |
| 266 | 4-aminoaniline-3-sulphonic acid |
| 267 | 3-aminoaniline-4,6-disulphonic acid |
| 268 | 4-aminoaniline-2,5-disulphonic acid |
| 269 | sulphanilic acid |

Following the procedure in Example 1, similar dyestuffs are obtained if the 2,4-dichloro-6-arylamino-s-triazines used in Examples 259–269 are replaced by equivalent amounts of the following acylating agents:

| Example | Acylating Agent |
|---|---|
| 270 | 2,4-dichloro-6-beta-hydroxyethylamino-s-triazine |
| 271 | 2,4-dichloro-6-di-beta-hydroxyethylamino-s-triazine |
| 272 | 2,4-dichloro-6-beta-hydroxypropylamino-s-triazine |
| 273 | 2,4-dichloro-6-methoxy-s-triazine |
| 274 | 2,4-dichloro-6-amino-s-triazine |
| 275 | 2,4-dichloro-6-methylamino-s-triazine |
| 276 | 2,3-dichloroquinoxaline-6-sulphonyl chloride |
| 277 | 2,4,5,6-tetrachloropyrimidine |
| 278 | 2,4-dichloro-6-n-butoxy-s-triazine |
| 279 | 2,4-dichloro-6-dimethylamino-s-triazine |
| 280 | 2,4,6-trichloropyrimidine |

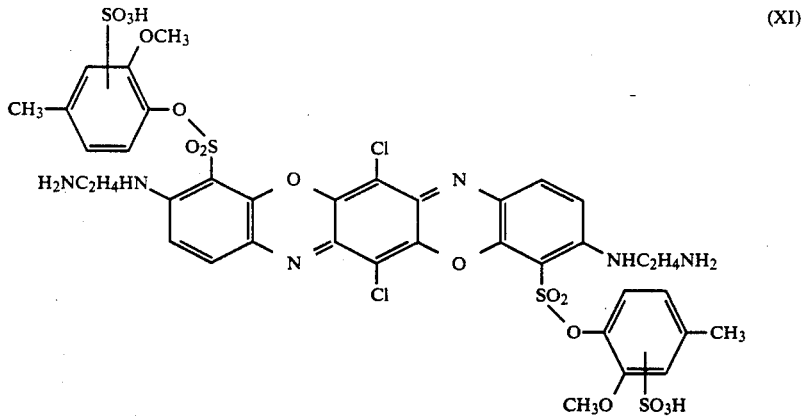

(XI)

When condensed with 2,4-dichloro-6-(2′,5′-disulphophenyl)amino-s-triazine in a similar manner to Example 1B, a product is obtained which dyes cellulose textile materials in bright reddish blue shades. Similar dyestuffs are obtained if the aniline 2,5-disulphonic acid used in

EXAMPLE 281

If 3-methyl-4-chlorophenol is used in place of phenol and di(4-aminoethyl)ether is used in place of ethylene diamine in Example 1, a dyebase is obtained which is believed to have structure (XII):

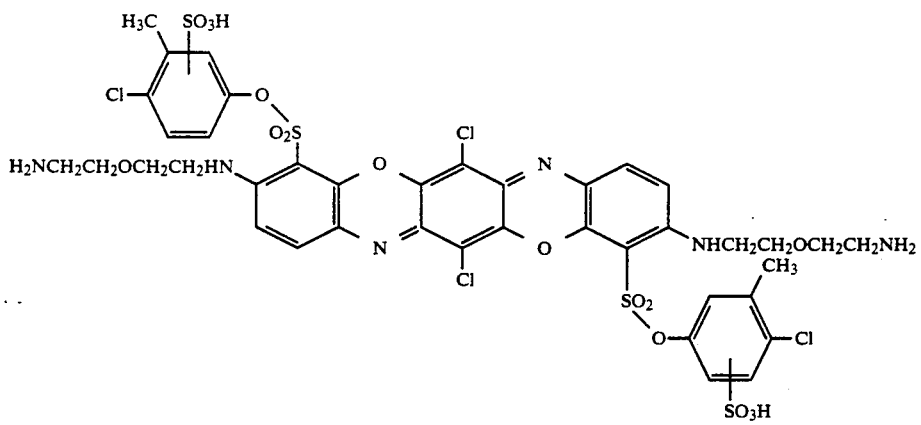

(XII)

When condensed with 2,4-dichloro-6-(2',5'-disulphophenyl)amino-s-triazine in a similar manner to Example 1B, a product is obtained which dyes cellulose textile materials in bright reddish blue shades. Similar dyestuffs are obtained if the aniline 2,5-disulphonic acid used in Example 281 is replaced by equivalent amounts of the following amines:

| Example | Amine |
|---|---|
| 282 | 2-carboxyaniline-4,5-disulphonic acid |
| 283 | metanilic acid |
| 284 | aniline-3,5-disulphonic acid |
| 285 | N-sulphomethylaniline |
| 286 | aniline-2,4-disulphonic acid |
| 287 | 2-carboxyaniline-4-sulphonic acid |
| 288 | 3-aminoaniline-4-sulphonic acid |
| 289 | 4-aminoaniline-3-sulphonic acid |
| 290 | 3-aminoaniline-4,6-disulphonic acid |
| 291 | 4-aminoaniline-2,5-disulphonic acid |
| 292 | sulphanilic acid |

Following the procedure in Example 1, similar dyestuffs are obtained if the 2,4-dichloro-6-arylamino-s-triazines used in Examples 282–292 are replaced by equivalent amounts of the following acylating agents:

| Example | Acylating Agent |
|---|---|
| 293 | 2,4-dichloro-6-beta-hydroxyethylamino-s-triazine |
| 294 | 2,4-dichloro-6-di-beta-hydroxyethylamino-s-triazine |
| 295 | 2,4-dichloro-6-beta-hydroxypropylamino-s-triazine |
| 296 | 2,4-dichloro-6-methoxy-s-triazine |
| 297 | 2,4-dichloro-6-amino-s-triazine |
| 298 | 2,4-dichloro-6-methylamino-s-triazine |
| 299 | 2,3-dichloroquinoxaline-6-sulphonyl chloride |
| 300 | 2,4,5,6-tetrachloropyrimidine |
| 301 | 2,4-dichloro-6-n-butoxy-s-triazine |
| 302 | 2,4-dichloro-6-dimethylamino-s-triazine |
| 303 | 2,4,6-trichloropyrimidine |

EXAMPLE 304

If 2-chlorophenol is used in place of phenol in Example 1, a dyebase is obtained which is believed to have structure (XIII):

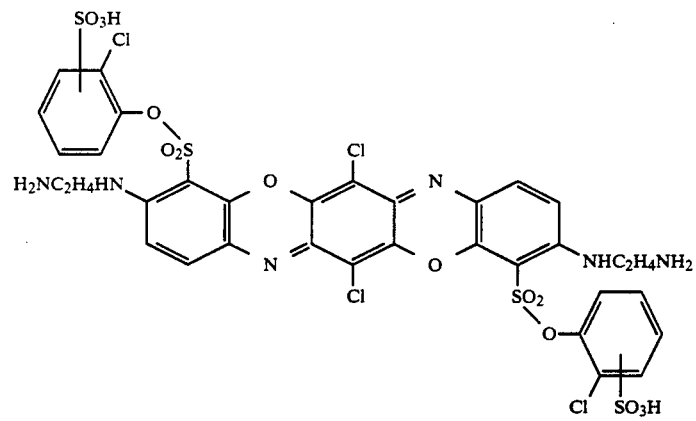

(XIII)

When condensed with 2,4-dichloro-6-(2',5'-disulphophenyl)amino-s-triazine in a similar manner to Example 1B, a product is obtained which dyes cellulose textile materials in bright reddish blue shades. Similar dyestuffs are obtained if the aniline 2,5-disulphonic acid used in Example 304 is replaced by equivalent amounts of the following amines:

| Example | Amine |
|---|---|
| 305 | 2-carboxyaniline-4,5-disulphonic acid |
| 306 | metanilic acid |
| 307 | aniline-3,5-disulphonic acid |
| 308 | N-sulphomethylaniline |
| 309 | aniline-2,4-disulphonic acid |
| 310 | 2-carboxyaniline-4-sulphonic acid |
| 311 | 3-aminoaniline-4-sulphonic acid |
| 312 | 4-aminoaniline-3-sulphonic acid |
| 313 | 3-aminoaniline-4,6-disulphonic acid |

| Example | Amine |
|---------|-------|
| 314 | 4-aminoaniline-2,5-disulphonic acid |
| 315 | sulphanilic acid |

Following the procedure in Example 1, similar dyestuffs are obtained if the 2,4-dichloro-6-arylamino-s-triazines used in Examples 305-315 are replaced by equivalent amounts of the following acylating agents:

| Example | Acylating Agent |
|---------|----------------|
| 316 | 2,4-dichloro-6-beta-hydroxyethylamino-s-triazine |
| 317 | 2,4-dichloro-6-di-beta-hydroxyethylamino-s-triazine |
| 318 | 2,4-dichloro-6-beta-hydroxypropylamino-s-triazine |
| 319 | 2,4-dichloro-6-methoxy-s-triazine |
| 320 | 2,4-dichloro-6-amino-s-triazine |
| 321 | 2,4-dichloro-6-methylamino-s-triazine |
| 322 | 2,3-dichloroquinoxaline-6-sulphonyl chloride |
| 323 | 2,4,5,6-tetrachloropyrimidine |
| 324 | 2,4-dichloro-6-n-butoxy-s-triazine |
| 325 | 2,4-dichloro-6-dimethylamino-s-triazine |
| 326 | 2,4,6-trichloropyrimidine |

EXAMPLE 327

If 4-methylphenol is used in place of phenol and 1,3-propylene dimine is used in place of ethylene diamine in Example 1, a dyebase is obtained which is believed to have structure (XIV):

| Example | Amine |
|---------|-------|
| 328 | 2-carboxyaniline-4,5-disulphonic acid |
| 329 | metanilic acid |
| 330 | aniline-3,5-disulphonic acid |
| 331 | N-sulphomethylaniline |
| 332 | aniline-2,4-disulphonic acid |
| 333 | 2-carboxyaniline-4-sulphonic acid |
| 334 | 3-aminoaniline-4-sulphonic acid |
| 335 | 4-aminoaniline-3-sulphonic acid |
| 336 | 3-aminoaniline-4,6-disulphonic acid |
| 337 | 4-aminoaniline-2,5-disulphonic acid |
| 338 | sulphanilic acid |

Following the procedure in Example 1, similar dyestuffs are obtained if the 2,4-dichloro-6-arylamino-s-triazines used in Examples 328-338 are replaced by equivalent amounts of the following acylating agents:

| Example | Acylating Agent |
|---------|----------------|
| 339 | 2,4-dichloro-6-beta-hydroxyethylamino-s-triazine |
| 340 | 2,4-dichloro-6-di-beta-hydroxyethylamino-s-triazine |
| 341 | 2,4-dichloro-6-beta-hydroxypropylamino-s-triazine |
| 342 | 2,4-dichloro-6-methoxy-s-triazine |
| 343 | 2,4-dichloro-6-amino-s-triazine |
| 344 | 2,4-dichloro-6-methylamino-s-triazine |
| 345 | 2,3-dichloroquinoxaline-6-sulphonyl chloride |
| 346 | 2,4,5,6-tetrachloropyrimidine |
| 347 | 2,4-dichloro-6-n-butoxy-s-triazine |
| 348 | 2,4-dichloro-6-dimethylamino-s-triazine |
| 349 | 2,4,6-trichloropyrimidine |

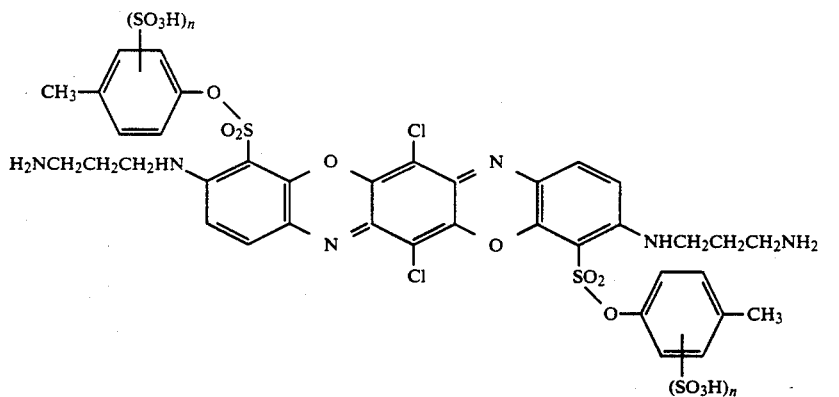

(XIV)

n = 1 or 2

When condensed with 2,4-dichloro-6-(2',5'-disulphophenyl)amino-s-triazine in a similar manner to Example 1B, a product is obtained which dyes cellulose textile materials in bright reddish blue shades. Similar dyestuffs are obtained if the aniline 2,5-disulphonic acid used in Example 327 is replaced by equivalent amounts of the following amines:

EXAMPLE 350

If 4-acetylaminophenol is used in place of phenol in Example 1, a dyebase is obtained which is believed to have structure (XV):

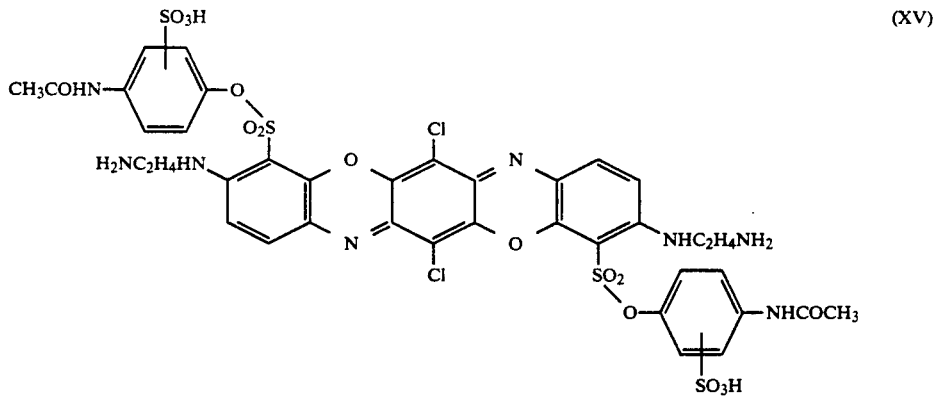

(XV)

When condensed with 2,4-dichloro-6-(2',5'-disulphophenyl)amino-s-triazine in a similar manner to Example 1B, a product is obtained which dyes cellulose textile materials in bright reddish blue shades. Similar dyestuffs are obtained if the aniline 2,5-disulphonic acid used in Example 350 is replaced by equivalent amounts of the following amines:

| Example | Amine |
|---------|-------|
| 351 | 2-carboxyaniline-4,5-disulphonic acid |
| 352 | metanilic acid |
| 353 | aniline-3,5-disulphonic acid |
| 354 | N-sulphomethylaniline |
| 355 | aniline-2,4-disulphonic acid |
| 356 | 2-carboxyaniline-4-sulphonic acid |
| 357 | 3-aminoaniline-4-sulphonic acid |
| 358 | 4-aminoaniline-3-sulphonic acid |
| 359 | 3-aminoaniline-4,6-disulphonic acid |
| 360 | 4-aminoaniline-2,5-disulphonic acid |
| 361 | sulphanilic acid |

Following the procedure in Example 1, similar dyestuffs are obtained if the 2,4-dichloro-6-arylamino-s-triazines used in Examples 351–361 are replaced by equivalent amounts of the following acylating agents:

| Example | Acylating Agent |
|---------|-----------------|
| 362 | 2,4-dichloro-6-beta-hydroxyethylamino-s-triazine |
| 363 | 2,4-dichloro-6-di-beta-hydroxyethylamino-s-triazine |
| 364 | 2,4-dichloro-6-beta-hydroxypropylamino-s-triazine |
| 365 | 2,4-dichloro-6-methoxy-s-triazine |
| 366 | 2,4-dichloro-6-amino-s-triazine |
| 367 | 2,4-dichloro-6-methylamino-s-triazine |
| 368 | 2,3-dichloroquinoxaline-6-sulphonyl chloride |
| 369 | 2,4,5,6-tetrachloropyrimidine |
| 370 | 2,4-dichloro-6-n-butoxy-s-triazine |
| 371 | 2,4-dichloro-6-dimethylamino-s-triazine |
| 372 | 2,4,6-trichloropyrimidine |

EXAMPLE 373

If 4-(beta-hydroxyethylsulphonyl)phenol is used in place of phenol in Example 1, a reactive dyestuff is obtained which is believed to have structure (XVI):

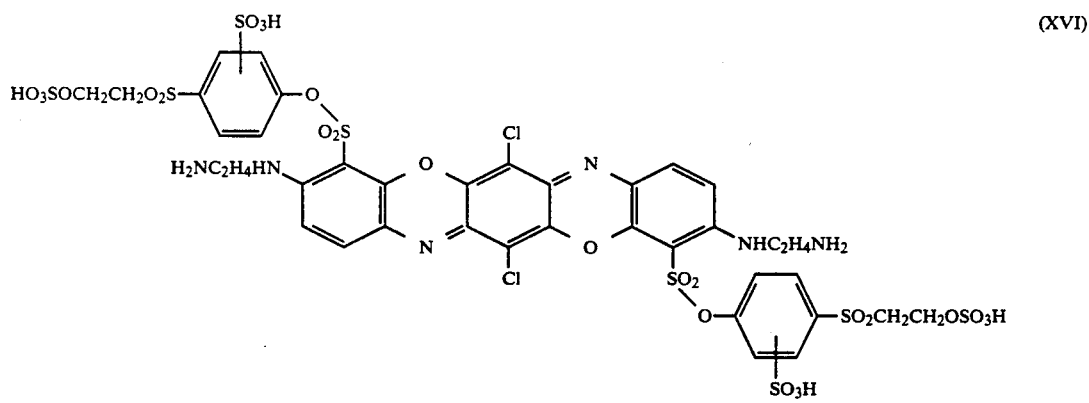

(XVI)

EXAMPLE 374

If 4-(beta-hydroxyethylsulphonyl)aniline is used in place of ethylene diamine in Example 1, a reactive dyestuff is obtained which is believed to have structure (XVII):

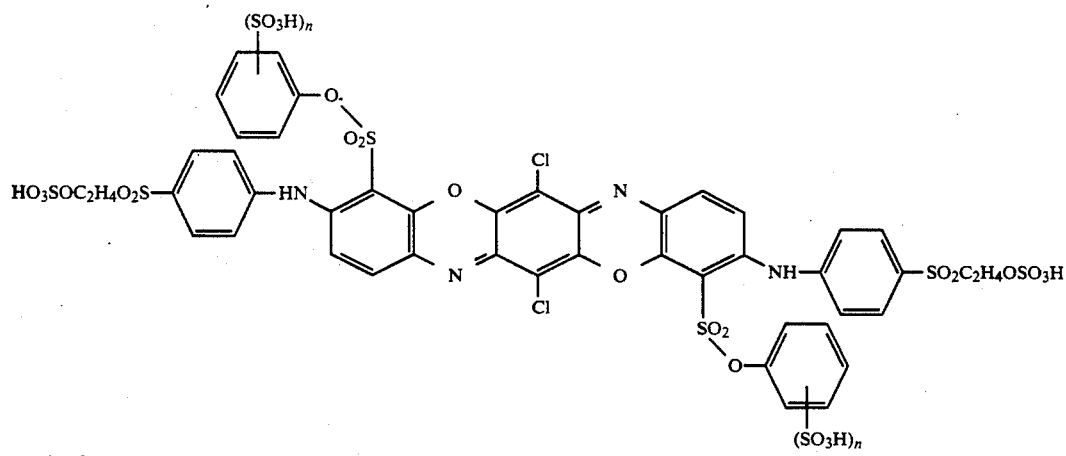

(XVII)

n = 1 or 2

EXAMPLE 375

If 2-(beta-hydroxyethylsulphonyl)ethylaniline is used in place of ethylene diamine in Example 1, a reactive dyestuff is obtained which is believed to have structure (XVIII):

EXAMPLE 376

If 4-(beta-sulphatoethylsulphonyl)aniline is used in place of aniline-2,5-disulphonic acid in Example 1C and the reaction is carried out at pH 5-6 instead of pH 7-8, a reactive dyestuff is obtained which is believed to have structure (XIX):

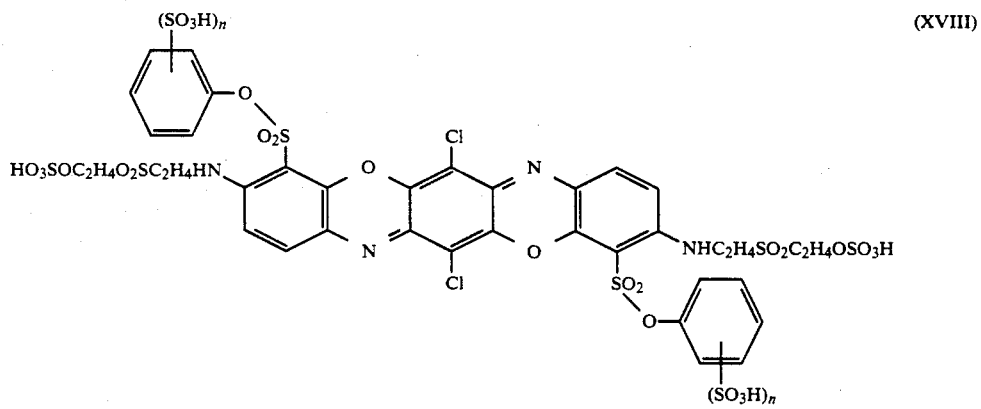

(XVIII)

n = 1 or 2

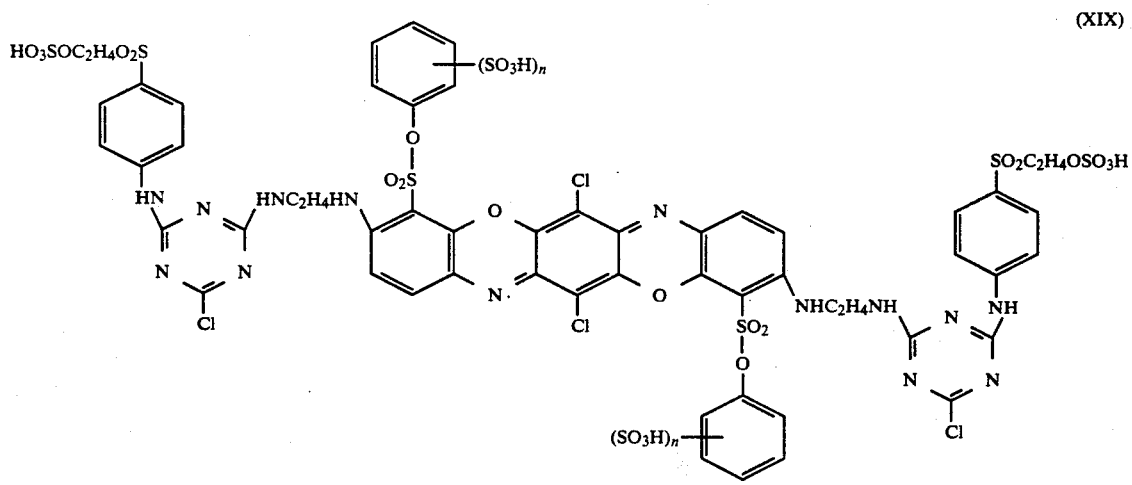

(XIX)

n = 1 or 2

We claim:

1. A triphenodioxazine reactive dye which, in the free acid form, has the formula:

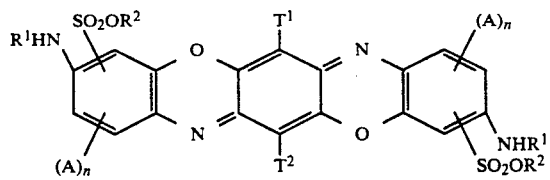

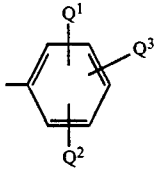

wherein each of $T^1$ and $T^2$, independently, represents H, Cl, Br, F, $SO_3H$ or $C_{1-4}$-alkyl, phenyl, sulphophenyl, methylphenyl, disulphophenyl, dimethylphenyl, methoxyphenyl, dimethoxyphenyl, chlorophenyl, dichlorophenyl, methylchlorophenyl, methoxymethylphenyl, methoxychlorophenyl, aminophenyl or acetylaminophenyl;

- $R^1$ represents H, —X—$NR^3$—Z, alkyl, cycloalkyl, optionally substituted aralkyl or aryl, or a triazinyl or pyrimidinyl group;
- $R^2$ represents $C_{1-4}$-alkyl or an optionally substituted phenyl;
- A represents $C_{1-4}$-alkyl, $C_{1-4}$-alkoxy, Cl, COOH or $SO_3H$;
- X represents $C_{1-4}$-alkylene, aralkylene or arylene group;
- $R^3$ represents H, $C_{1-4}$-alkyl or phenyl;
- Z represents a cellulose-reactive group; and
- n has a value of 0 or 1, provided that the dye contains at least two $SO_3H$ groups and at least two cellulose reactive groups.

2. A reactive dye according to claim 1 wherein $R^1$ is $C_{1-4}$-alkyl.

3. A reactive dye according to claim 1 wherein $R^2$ is selected from the group consisting of sulphophenyl, methylphenyl, disulphophenyl, dimethylphenyl, methoxyphenyl, dimethoxyphenyl, chlorophenyl, dichlorophenyl, methylchlorophenyl, methoxymethylphenyl, methoxychlorophenyl, aminophenyl or acetylaminophenyl group.

4. A reactive dye according to claim 1 wherein $R^1$ is a group of the formula:

—X—$NR^3$—Z wherein X represents a $C_{1-4}$-alkylene, aralkylene or arylene group, $R^3$ represents hydrogen, $C_{1-4}$-alkyl or phenyl, and Z represents a cellulose-reactive group.

5. A reactive dye according to claim 1 wherein $R^2$ is a group of the formula:

wherein each of $Q^1$ and $Q^2$ represents hydrogen, chlorine, bromine, $C_{1-4}$-alkyl, $C_{1-4}$-alkoxy, acetamido or sulpho and $Q^3$ represents $Q^1$ or a cellulose-reactive substituent.

6. A reactive dye according to claim 4 wherein Z is a monohalogenotriazinyl group.

7. A triphenodioxazine reactive dye which, in the free acid form, has the formula:

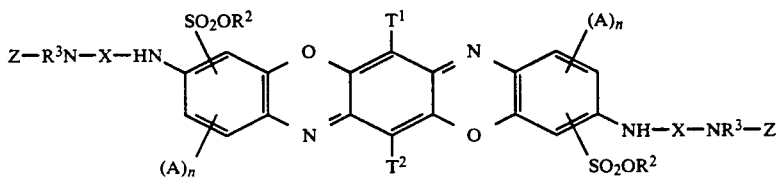

wherein $T^1$ and $T^2$ are each independently H, Cl, Br, F, $SO_3H$, $C_{1-4}$-alkyl, phenyl, sulphophenyl, methylphenyl, disulphophenyl, dimethylphenyl, methoxyphenyl, dimethoxyphenyl, chlorophenyl, dichlorophenyl, methylchlorophenyl, methoxymethylphenyl, methoxychlorophenyl, aminophenyl or acetylaminophenyl;

X represents:
ethylene
1,2- and 1,3-propylene
2-hydroxy-1,3-propylene
1- and 2-phenyl-1,3-propylene
2-(4'-sulphophenyl)-1,3-propylene
1,4-, 2,3- and 2,4-butylene
2-methyl-1,3-propylene
2-methyl-2,4-pentylene
2,2-dimethyl-1,3-propylene
1-phenylethylene
1-chloro-2,3-propylene
1,6- and 2,5-hexylene
2,3-diphenyl-1,4-butylene
1-(methoxycarbonyl)-1,5-pentylene
1-carboxy-1,5-pentylene
2,7-heptylene
3-methyl-1,6-hexylene

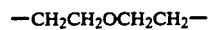

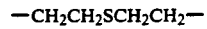

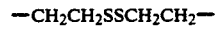

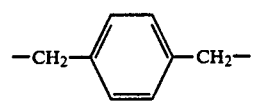

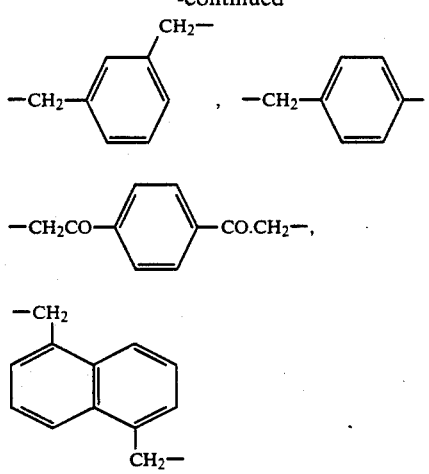
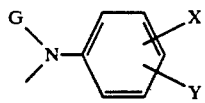

R² represents C₁₋₄-alkyl or an optionally substituted benzyl, phenyl, sulphophenyl, methylphenyl, disulphophenyl, dimethylphenyl, methoxyphenyl, dimethoxyphenyl, chlorophenyl, dichlorophenyl, methylchlorophenyl, methoxymethylphenyl, methoxychlorophenyl, aminophenyl or acetylaminophenyl group;

R³ represents H, C₁₋₄-alkyl or phenyl;

A represents C₁₋₄-alkyl, C₁₋₄-alkoxy, Cl, COOH or SO₃H;

n has a value of 0 or 1;

Z represents a triazinyl or pyrimidinyl group;

provided that the dye has at least 2 SO₃H groups.

8. A triphenodioxazine reactive dye according to claim 7 in which Z represents a triazinyl or pyrimidinyl group having at least one chloro or fluoro substituent.

9. A triphenodioxazine reactive dye according to claim 7 in which Z represents a triazin-2-yl group having F, Br, Cl or a nicotinyl group at the 4-position; and at the 6-position having F, Br, Cl, nicotinyl, or a substituent selected from the group consisting of C₁₋₄-alkoxy, beta-methoxy-ethoxy, beta-ethoxyethoxy, phenoxy and sulphophenoxy; amino; methylamino, ethylamino, butylamino, dimethylamino, diethylamino, methylethylamino, dibutylamino, beta-hydroxyethylamino, di(-beta-hydroxyethyl)amino, beta-cyano-ethylamino, di(-beta-cyanoethyl)amino, beta-sulphoethylamino, beta-hydroxypropylamino, (beta-hydroxybutyl)ethylamino, (beta-hydroxyethyl)methylamino, cyclohexylamino; morpholino, piperazino; naphthylamino substituted by 1, 2 or 3 SO₃H groups and phenylamino groups of the Formula (3):

$$G-N(CH_3)-C_6H_3(X)(Y) \quad (3)$$

wherein G is H, methyl, ethyl, sulphomethyl, beta-carboxy-, beta-hydroxy-or beta-cyanoethyl and Y and X are each independently selected from H, COOH, SO₃H, CH₃, C₂H₅, OCH₃, OC₂H₅, Cl, Br, CN, NO₂, NHCOCH₃ and beta-sulphatoethylsulphonyl.

10. A triphenodioxazine reactive dye according to claim 9 in which Z represents a triazin-2-yl group having F, Br, Cl or a nicotinyl group at the 4-position; and at the 6-position having F, Br, Cl, nicotinyl, or a phenylamino group of Formula (3) wherein G is H, methyl or ethyl; and X and Y are each independently H or SO₃H.

11. A triphenodioxazine reactive dye according to claim 9 in which R² represents a C₁₋₄-alkyl, benzyl, mono-sulphobenzyl, di-sulphobenzyl, phenyl, sulphophenyl, methylphenyl, disulphophenyl, dimethylphenyl, methoxyphenyl, dimethoxyphenyl, chlorophenyl, dichlorophenyl, methylchlorophenyl, methoxymethylphenyl, methoxychlorophenyl, aminophenyl or acetylaminophenyl group.

12. A triphenodioxazine reactive dye which, in the free acid form, has the formula:

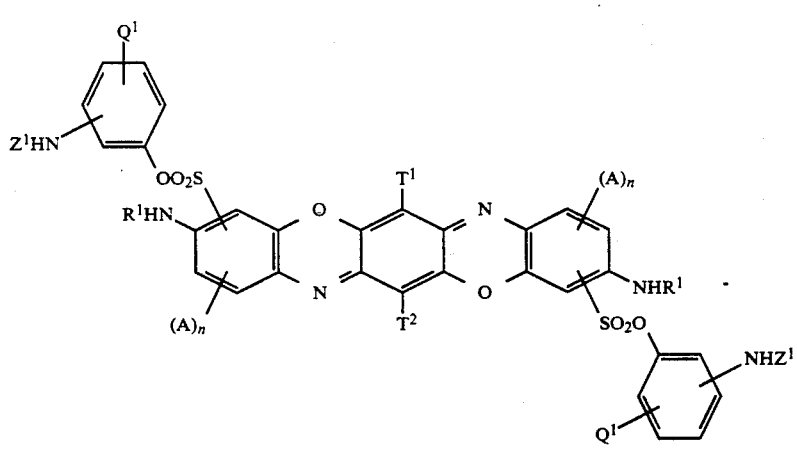

wherein
T', T², A and n are as defined in claim 7;
Q' represents H, chlorine, bromine, C₁₋₄-alkyl, C₁₋₄-alkoxy, acetamido or sulpho;
R' represents H, alkyl, cycloalkyl, optionally substituted aralkyl or aryl, or a triazinyl or pyrimidinyl group;
Z' represents a triazinyl or pyrimidinyl group;
provided that the dye contains at least two SO₃H groups and at least two cellulose-reactive groups.

13. A triphenodioxazine dye according to claim 12 wherein Q' is H, Cl, Br or SO₃H; R' is H or sulphatoethyl; and Z' is monohalogenotriazinyl.

14. A triphenodioxazine reactive dye which, in the free acid form, has the formula:

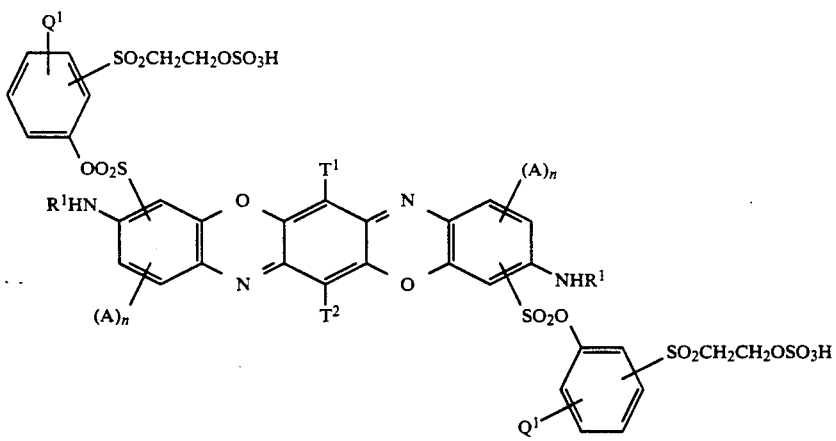

wherein
T', T² , A and n are as defined in claim 7;
R' represents H, alkyl, cycloalkyl or optionally substituted aralkyl or aryl, or a triazinyl or pyrimidinyl group;
Q' represents H, chlorine, bromine, $C_{1-4}$-alkyl, $C_{1-4}$-alkoxy, acetamido or sulpho;
provided that the dye contains at least two $SO_3H$ groups and at least two cellulose-reactive groups.

15. A triphenodioxazine reactive dye which, in the free acid form, has the formula:

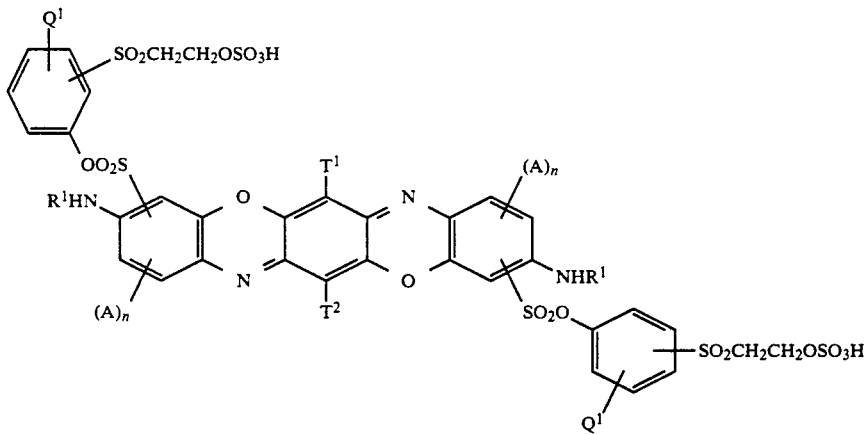

wherein:
R' is H, $C_{1-4}$-alkyl or a group of formula —X—NR³—Z;
Q' is H, chloro, bromo or sulpho; and
Z is a heterocyclic group having 1, 2 or 3 nitrogen atoms in the heterocyclic ring and at least one cellulose reactive substituent on a carbon atom of the ring;
n has a value of 0 or 1;
A represents $C_{1-4}$-alkyl, $C_{1-4}$-alkoxy, Cl, COOH or $SO_3H$;
R³ is H, $C_{1-4}$-alkyl or phenyl; and
X represents:
ethylene
1,2- and 1,3-propylene
2-hydroxy-1,3-propylene
1- and 2-phenyl-1,3-propylene
2-(4'-sulphophenyl)-1,3-propylene
1,4-, 2,3- and 2,4-butylene
2-methyl-1,3-propylene
2-methyl-2,4-pentylene
2.2-dimethyl-1,3-propylene
1-phenylethylene
1-chloro-2,3-propylene
1,6- and 2,5-hexylene
2,3-diphenyl-1,4-butylene
1-(methoxycarbonyl)-1,5-pentylene
1-carboxy-1,5-pentylene
2,7-heptylene
3-methyl-1,6-hexylene

—CH₂CH₂OCH₂CH₂—

—CH₂CH₂SCH₂CH₂—

—CH₂CH₂SSCH₂CH₂—

—CH₂CH₂—N⟨  ⟩N—CH₂CH₂—,

—CH₂—⟨phenyl⟩—CH₂—

-continued
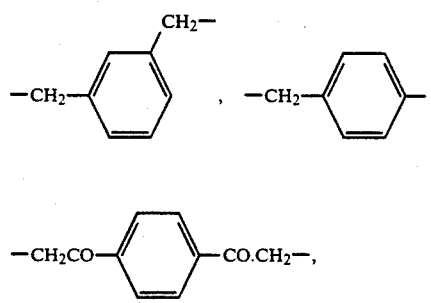
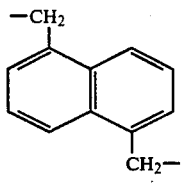
provided that the dye has at least two SO₃H groups.
16. A dye according to claim 15 in which R' is H, or C₁₋₄-alkyl.
* * * * *